(12) United States Patent
Lida et al.

(10) Patent No.: US 8,665,929 B1
(45) Date of Patent: Mar. 4, 2014

(54) METHOD AND DEVICE FOR DETERMINISTIC TIMING ACQUIRING AND TRACKING

(75) Inventors: Eyran Lida, Kfar Ha-Oranim (IL); Gaby Gur Cohen, Tel-Mond (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 433 days.

(21) Appl. No.: 13/106,114

(22) Filed: May 12, 2011

(51) Int. Cl.
 *H04B 1/38* (2006.01)
(52) U.S. Cl.
 USPC ........... 375/219; 375/327; 375/348; 375/373; 375/376; 375/233; 375/358; 375/371; 375/294; 375/356; 327/147; 327/456; 370/278; 370/350; 370/503
(58) Field of Classification Search
 USPC ......... 375/219, 327, 348, 373, 376, 233, 358, 375/371, 294, 356; 327/147, 456, 156; 370/278, 350, 503
 See application file for complete search history.

(56) References Cited

U.S. PATENT DOCUMENTS

| | | | |
|---|---|---|---|
| 5,661,425 A * | 8/1997 | Minoda et al. ............... 327/159 | |
| 6,201,831 B1 | 3/2001 | Agazzi et al. | |
| 6,226,332 B1 | 5/2001 | Agazzi et al. | |
| 6,249,544 B1 | 6/2001 | Azazzi et al. | |
| 6,252,904 B1 | 6/2001 | Agazzi et al. | |
| 6,253,345 B1 | 6/2001 | Agazzi et al. | |
| 6,707,848 B2 | 3/2004 | Agazzi et al. | |
| 6,792,038 B2 * | 9/2004 | Agazzi ......................... 375/220 |
| 7,342,982 B2 | 3/2008 | Lin et al. | |
| 7,656,938 B2 | 2/2010 | Agazzi et al. | |

* cited by examiner

*Primary Examiner* — Daniel Washburn
*Assistant Examiner* — Rahel Guarino

(57) ABSTRACT

Assuring acquisition of symbol timing in a full-duplex data transceiver under inter-symbol interference conditions. One embodiment includes a transmitter comprising a first local clock having a first free running frequency, and a receiver comprising a second local clock having a second frequency initially set to a value higher than the first free running frequency. A first type decision-directed timing recovery mechanism is intentionally limited to only decreasing the frequency of the second local clock. A second type decision-directed timing recovery mechanism is not limited to only decreasing the frequency. The receiver receives symbols, decrease the frequency of the second local clock to a third frequency value using the first type decision-directed timing recovery mechanism, disables the first type mechanism after reaching the third frequency, and then phase-lock the second local clock to the optimal phase under MMSE criteria using the second type decision-directed timing recovery mechanism.

31 Claims, 22 Drawing Sheets

METHOD AND DEVICE FOR DETERMINISTIC TIMING ACQUIRING AND TRACKING

BACKGROUND

Reaching time synchronicity between a transmitter and a receiver under inter-symbol interference conditions may be difficult, and sometimes even impossible. Timing recovery mechanism at the receiver may not work correctly, or alternatively lock in a wrong steady state condition in presence of inter-symbol interference. Some receivers employ an equalizer aimed at reducing inter-symbol interference. The equalizer is often used in conjunction with a timing recovery mechanism, wherein both the equalizer and timing recovery mechanism try to converge to a correct steady state operation simultaneously. Simultaneous convergence into a correct steady state operation may be either impossible or not produce deterministic results due to inter-dependencies between the equalizer and timing recovery mechanism.

BRIEF SUMMARY

In one embodiment, a method for assuring acquisition of symbol timing in a full-duplex data transceiver under inter-symbol interference conditions, including: determining a first inherent frequency inaccuracy of a first local clock belonging to a transmitter, and a second inherent frequency inaccuracy of a second local clock belonging to a receiver. Assuring that a first free running frequency of the first local clock is lower than a second free running frequency of the second local clock, by intentionally setting a difference between the second free running frequency and the first free running frequency to a value higher than sum of the first inherent inaccuracy and the second inherent inaccuracy. Using the first free running frequency to generate symbols at the transmitter. Receiving the generated symbols at the receiver. Decreasing, at the receiver, the frequency of the second local clock, to a third frequency value closer to the first free running frequency, using a first type decision-directed timing recovery mechanism that is intentionally limited to only decreasing and not increasing the frequency of the second local clock, wherein the limitation of the first type decision-directed timing recovery mechanism assures convergence into the third frequency value under substantial inter-symbol interference conditions. Disabling the first type decision-directed timing recovery mechanism after reaching the third frequency value. And phase-locking the second local clock to substantially optimal phase under MMSE criteria, using a second type decision-directed timing recovery mechanism, which is not limited to only decreasing the frequency of the second local clock.

In one embodiment, a method for assuring acquisition of symbol timing in a full-duplex data transceiver under inter-symbol interference conditions, including: determining a first inherent frequency inaccuracy of a first local clock belonging to a transmitter, and a second inherent frequency inaccuracy of a second local clock belonging to a receiver. Assuring that a first free running frequency of the first local clock is higher than a second free running frequency of the second local clock, by intentionally setting a difference between the first free running frequency and second first free running frequency to a value that is higher than sum of the first inherent inaccuracy and the second inherent inaccuracy. Using the first free running frequency to generate symbols at the transmitter. Receiving the generated symbols at the receiver. Increasing, at the receiver, the frequency of the second local clock, to a third frequency value that is closer to the first free running frequency, using a first type decision-directed timing recovery mechanism that is intentionally limited to only increasing and not decreasing the frequency of the second local clock, wherein the limitation of the first type decision-directed timing recovery mechanism assures convergence into the third frequency value under substantial inter-symbol interference conditions. Disabling the first type decision-directed timing recovery mechanism after reaching the third frequency value. And phase-locking the second local clock with the first local clock, using a second type decision-directed timing recovery mechanism, which is not limited to only increasing the frequency of the second local clock.

In one embodiment, a system for assuring acquisition of symbol timing in a full-duplex data transceiver under inter-symbol interference conditions, including: a transmitter including a first local clock having a first free running frequency. And a receiver including a second local clock having a second frequency initially set to a value higher than the first free running frequency, a first type decision-directed timing recovery mechanism that is intentionally limited to only decreasing and not increasing the frequency of the second local clock, and a second type decision-directed timing recovery mechanism that is not limited to only decreasing the frequency of the second local clock. Wherein the receiver is configured to receive, from the transmitter, symbols generated using the first local clock, decrease the frequency of the second local clock to a third frequency value that is closer to the first free running frequency using the first type decision-directed timing recovery mechanism, then disable the first type decision-directed timing recovery mechanism after reaching the third frequency value, and then phase-lock and keep track the second local clock to the optimal phase under MMSE criteria using the second type decision-directed timing recovery mechanism. And wherein the limitation of the first type decision-directed timing recovery mechanism is operative to assure convergence into the third frequency value under substantial inter-symbol interference conditions.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

In one embodiment, an equalizer and a timing recovery mechanism at a receiver are assured mutual convergence into a correct steady stage operation by breaking timing recovery process into essentially two phases and by setting a symbol clock at the transmitter to a lower frequency than a local timing clock at the receiver. In the first phase, a first type of a timing recovery mechanism is used, which is substantially immune to a condition where the equalizer is not yet adapted to reducing inter-symbol interference. The immunity is achieved by intentionally limiting the first type timing recovery mechanism to only decrease the frequency of the local timing clock at the receiver, as part of the timing recovery process. The limitation forces the frequency of the local timing clock at the receiver always down, reaching closer to the symbol clock frequency of the transmitter even under inter-symbol conditions and despite the equalizer still being not fully adapted. In the second phase, and after the local timing clock was brought closer to the frequency of the symbol clock, a second type of a timing recovery mechanism is used, which is essentially an ordinary timing recovery mechanism capable of both increasing and decreasing the local timing clock at the receiver. The second type timing recovery mechanism achieves a final frequency-lock of the local timing clock with the symbol clock of the transmitter and a lock of the best sampling phase under MMSE criteria. Final phase-lock is achieved simultaneously with convergence of the equalizer, which continuously adapts to the inter-symbol interference during both phases.

Figure 1:
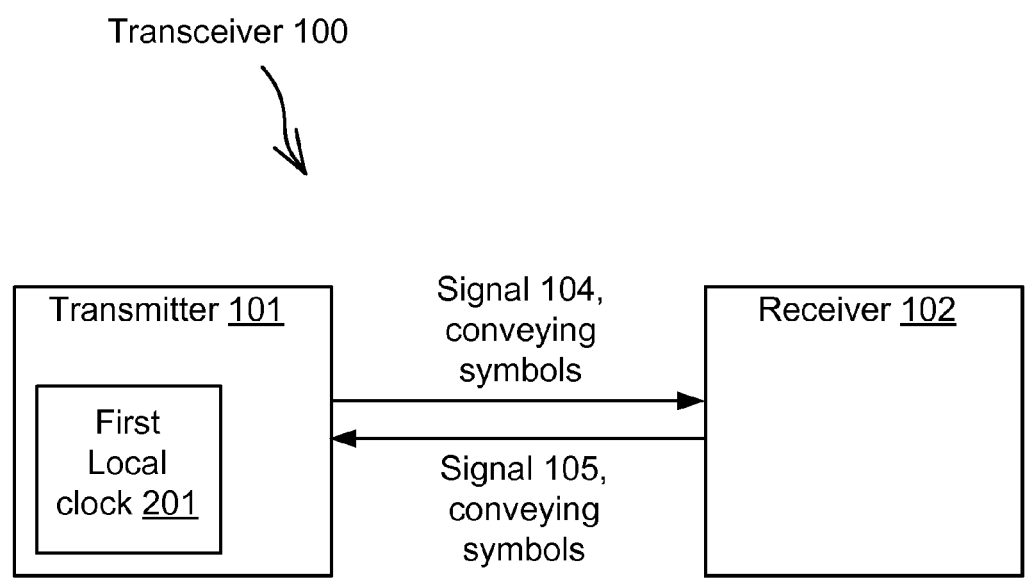
FIG. 1 illustrates one embodiment of a transceiver.
Figure 2A:
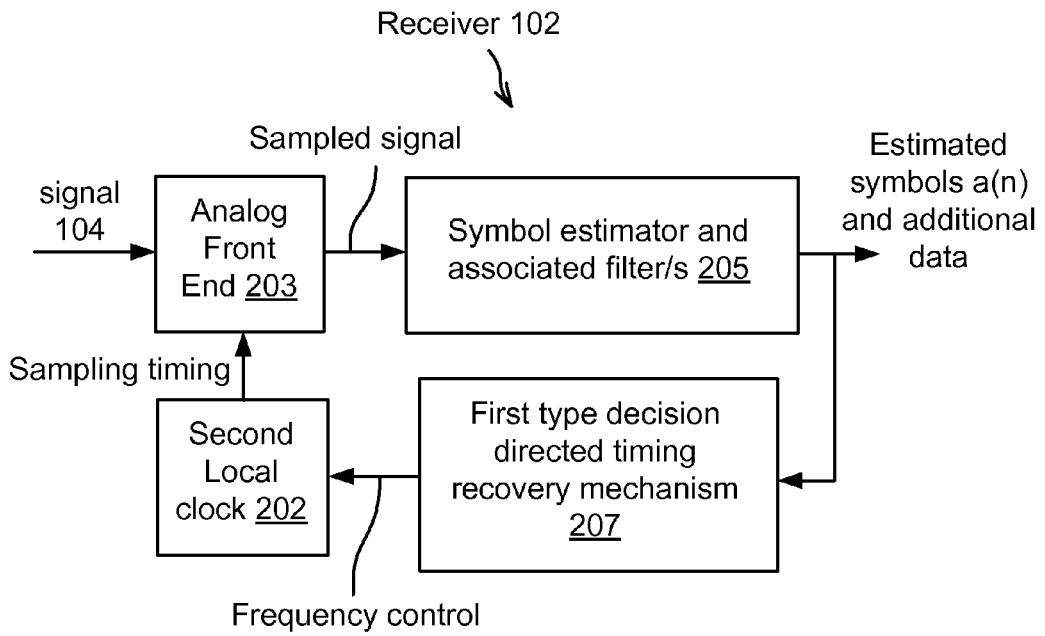
FIG. 2A illustrates one embodiment of a receiver.
Figure 2B:
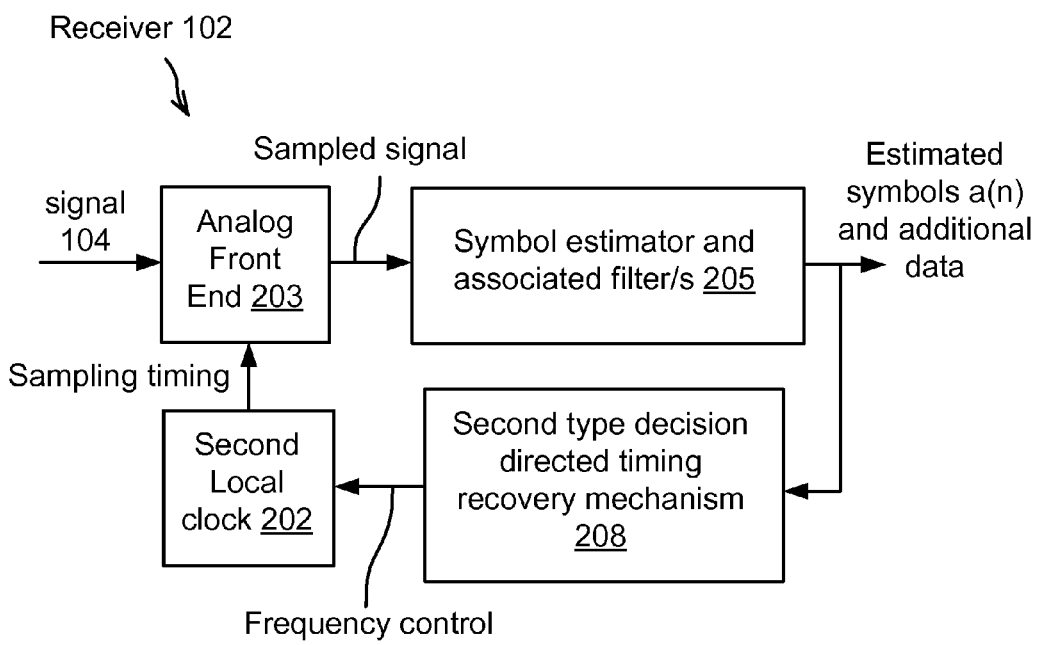
FIG. 2B illustrates one embodiment of a receiver.

FIG. 1, FIG. 2A, and FIG. 2B illustrate one embodiment of a system assuring acquisition of symbol timing in a full-duplex data transceiver 100 under inter-symbol interference conditions. Optionally, a first inherent frequency inaccuracy of a first local clock 201 belonging to a transmitter 101 is determined, and a second inherent frequency inaccuracy of a second local clock 202 belonging to a receiver 102 is determined. Determining the inherent frequency inaccuracies is done either by measuring the inherent frequency inaccuracies of the first local clock 201 and the second local clock 202, or by reading specifications of the first local clock 201 and the second local clock 202. A first free running frequency of the first local clock 201 is assured to be lower than a second free running frequency of the second local clock 202, by intentionally setting the difference between the second free running frequency and the first free running frequency to a value that is higher than the sum of the first inherent inaccuracy and the second inherent inaccuracy. According to one example, the first inherent frequency inaccuracy is +/−100 Parts Per Million (PPM), and the second inherent frequency inaccuracy is +/−50 PPM. The first free running frequency of the first local clock 201 is assured to be lower than a second free running frequency of the second local clock 202, by intentionally setting the first free running frequency to 125,000,000 Hz, and the second free running frequency (which can also be referred to as initial frequency of the second local clock) to 125,025,000 Hz, such that the difference between the second free running frequency and the first free running frequency (125,025,000−125,000,000=25,000 Hz) is higher than the sum of the first inherent inaccuracy and the second inherent inaccuracy (100PPM+50PPM=150PPM=18,750 Hz in this example). In other words, the actual free running frequency of the first local clock is assured to be lower than the actual initial frequency of the second local clock. The first free running frequency is then used to generate symbols at the transmitter, and the symbols are received at the receiver.

The receiver 102 then decreases the frequency of second local clock 202 to a third frequency value that is closer to the first free running frequency, using a first type decision-directed timing recovery mechanism 207 that is intentionally limited to only decreasing and not increasing the frequency of the second local clock 202. The limitation of the first type decision-directed timing recovery mechanism assures convergence into the third frequency value under substantial inter-symbol interference conditions. It is noted that the detrimental effect of inter-symbol interference is amplified in presence of a frequency difference between the first local clock 201 and the second local clock 202. This is further explained as follows. Signal 104 conveys symbols generated using the first local clock 201. The symbols arrive at the receiver 102 and are sampled by Analog Front End (AFE) 203. However, the second local clock 202 is still not phase-locked with the first local clock 201, and therefore AFE 203 does not yet produce a sampled signal which is suited for accurately estimating the symbols generated by transmitter 101. As a result, symbol-estimator-and-associated-filter/s 205 does not yet produce accurate estimated symbols; it is up to a decision directed timing recovery mechanism to process output/s of the symbol-estimator-and-associated-filter/s 205, and decide accordingly to decrease the frequency of the second local clock 202 in order to bring the frequency of second local clock 202 closer to the first free running frequency of the first local clock 201. A difficulty arises when an inter-symbol interference condition exists, where symbols affect neighboring symbols to varying degrees, and typically due to the medium over which signal 104 is transported. The difficulty is that inter-symbol interference may be present to a degree that prevents the decision directed timing recovery mechanism from correctly deciding to decrease the frequency of second local clock 202. When this happens, the estimated symbols may never sufficiently resemble the symbols generated by transmitter 101, and the receiver may lock in a wrong steady state resulting in high Bit Error Ratio (BER). A first type decision directed timing recovery mechanism 207 is therefore used in order to always force the frequency of second local clock 202 down, until it reached a third (optionally predetermined) frequency which is close enough to the first free running frequency. The first type decision directed timing recovery mechanism 207, which is operative to only decrease the frequency of the second local clock 202, may be realized in various ways, including (i) using a known decision directed timing recovery mechanism, but ignoring outputs that increase the frequency of the second local clock 202, (ii) modifying an underlying algorithm of a known decision directed timing recovery mechanism, such that the output of the modified decision directed timing recovery mechanism is inherently incapable of increasing the frequency of the second local clock 202, or (iii) using any other method producing an asymmetrical response favoring reduction of the frequency of the second local clock 202 over increment of the frequency of the second local clock 202. It is noted that the first type decision directed timing recovery mechanism 207 is only capable of reaching the third frequency (even under adverse inter-symbol interference conditions) but it is incapable of actually phase-locking the second local clock 202 with the first local clock 201 as a result of the first type decision directed timing recovery mechanism 207 not being able to command the second local clock 202 to increase its frequency. Actual phase-lock requires a decision directed timing recovery mechanism that is capable of commanding the second local clock 202 to decrease or increase its frequency, as a function of phase/frequency drift detected.

Therefore, after the third frequency is reached, the first type decision-directed timing recovery mechanism 207 is disabled, and a second type decision-directed timing recovery mechanism 208, which is not limited to only decreasing the frequency of the second local clock, is used to phase-lock the second local clock 202 with the first local clock 201. It is noted that the second type decision-directed timing recovery mechanism 208 is less immune to inter-symbol interference conditions as compared to the first type decision-directed timing recovery mechanism 207, but since it is activated after reaching the third frequency (which is closer to the first free running frequency), interferences introduced by timing error are relatively moderate, and therefore allow the second type decision-directed timing recovery mechanism 208 to reach phase-lock state despite presence of inter-symbol interference. According to one example, the first free running frequency is 125,000,000 Hz, and the initial frequency of the second local clock 202 is 125,025,000 Hz. At this point, the difference between the two frequencies is 25,000 Hz, which is large enough to amplify significantly the detrimental effect of inter-symbol interference present at transceiver 100. A first type decision-directed timing recovery mechanism 207, which can cope with both the 25,000 Hz frequency difference and the inter-symbol interference condition, is used to bring the frequency of second local clock 202 to a third frequency value of 125,005,000 Hz, which is closer to the first free running frequency. At this point, the inter symbol interference condition may still be present, but it is mitigated by the smaller frequency difference now at 5,000 Hz. Therefore, a second type decision-directed timing recovery mechanism 208 may now be used to reach phase-lock state, in which the frequency of the second local clock 202 is at 125,000,000 Hz, and is phase-locked with the first free running frequency.

Figure 3:
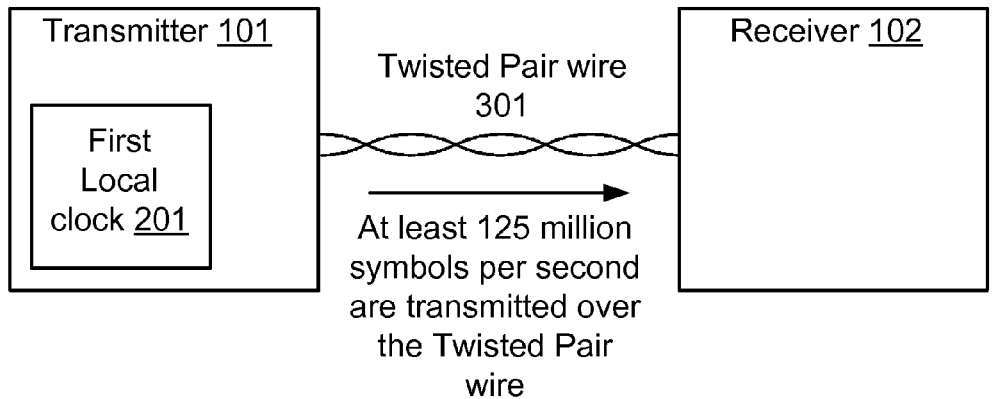
FIG. 3 illustrates one embodiment of a transceiver.
Figure 4:
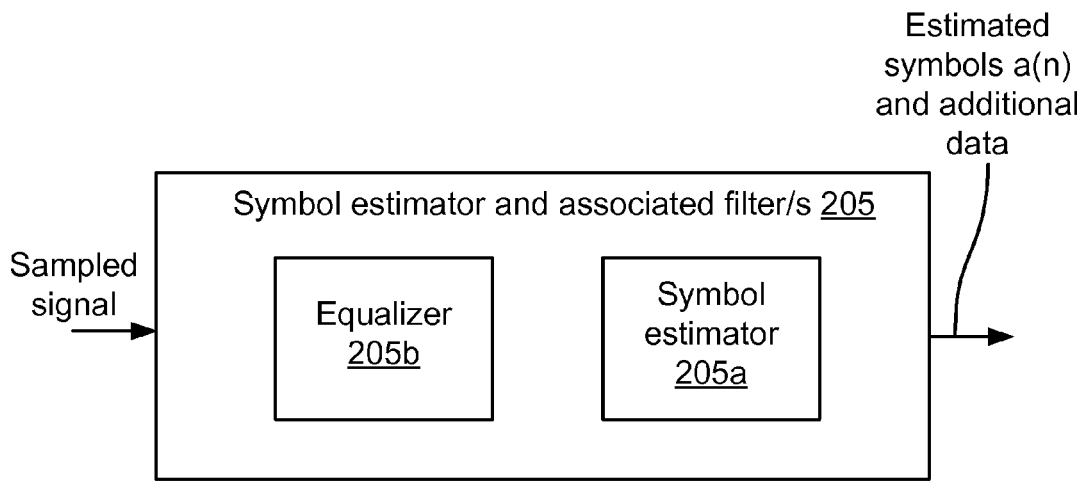
FIG. 4 illustrates one embodiment of symbol estimator and associated filter/s.

FIG. 3 and FIG. 4 illustrate one embodiment in which the transmitter 101 is coupled to the receiver 102 via a twisted-pair wire 301, the symbols are transmitted at a rate of at least 125 million symbols per second, and therefore the receiver 102 includes an equalizer 205b operative to reduce inter-symbol interferences. The equalizer 205b is part of symbol-estimator-and-associated-filter/s 205, which also includes a symbol estimator 205a. Equalizer 205b reduces inter-symbol interferences caused mainly by the transfer function of twisted pair wire 301 when interconnecting transmitter 101 and receiver 102. In one embodiment, the twisted pair wire 301 belongs to a category-5 (CAT-5) wire. In one embodiment, the transceiver 100 is used to communicate 1000-BaseT signals (Gigabit Ethernet signals). Convergence to the third frequency value is possible even during a period that inter-symbol interference is substantially present as a result of the equalizer 205b still being in transient state and the receiver 102 still not reaching a state of phase-locking the second local clock 202 with the first local clock 201. Convergence to the third frequency is done using the first type decision-directed timing recovery mechanism 207 that is intentionally limited to only decreasing and not increasing the frequency of the second local clock. Inter-symbol interferences are substantially eliminated by allowing the equalizer 205b to reach steady state operation in conjunction with the second type decision-directed timing recovery mechanism 208, while phase-locking the second local clock 202 with the first local clock 201. According to one example, the first free running frequency is 1,000,000,000 Hz, and the initial frequency of the second local clock 202 is 1,000,100,000 Hz. At this point, the equalizer 205b is not yet converged to a state allowing a significant reduction of inter-symbol interference. Therefore, a first type decision-directed timing recovery mechanism 207 is used to bring the frequency of second local clock 202 to a third frequency value of 1,000,000,500 Hz. At this point, some inter symbol interference may still be present, but to a much lesser degree, as a result of the equalizer 205b starting to converge to a state allowing a significant reduction of inter-symbol interference. A second type decision-directed timing recovery mechanism 208 may now be used to reach phase-lock state, in which the frequency of the second local clock 202 is at 1,000,000,000 Hz, and is phase-locked with the first free running frequency. At this point, the equalizer 205b may reach steady state operation, in which inter-symbol interference is substantially eliminated.

In one embodiment, the first inherent frequency inaccuracy of first local clock 201 is below +/−100 PPM, the second inherent frequency inaccuracy of second local clock 202 is below +/−100 PPM, and the difference between the second free running frequency and the first free running frequency is below 200 PPM. In one embodiment, the first inherent frequency inaccuracy of first local clock 201 is below +/−100 PPM, the second inherent frequency inaccuracy of second local clock 202 is below +/−100 PPM, and the difference between the second free running frequency and the first free running frequency is above 200 PPM.

Figure 5:
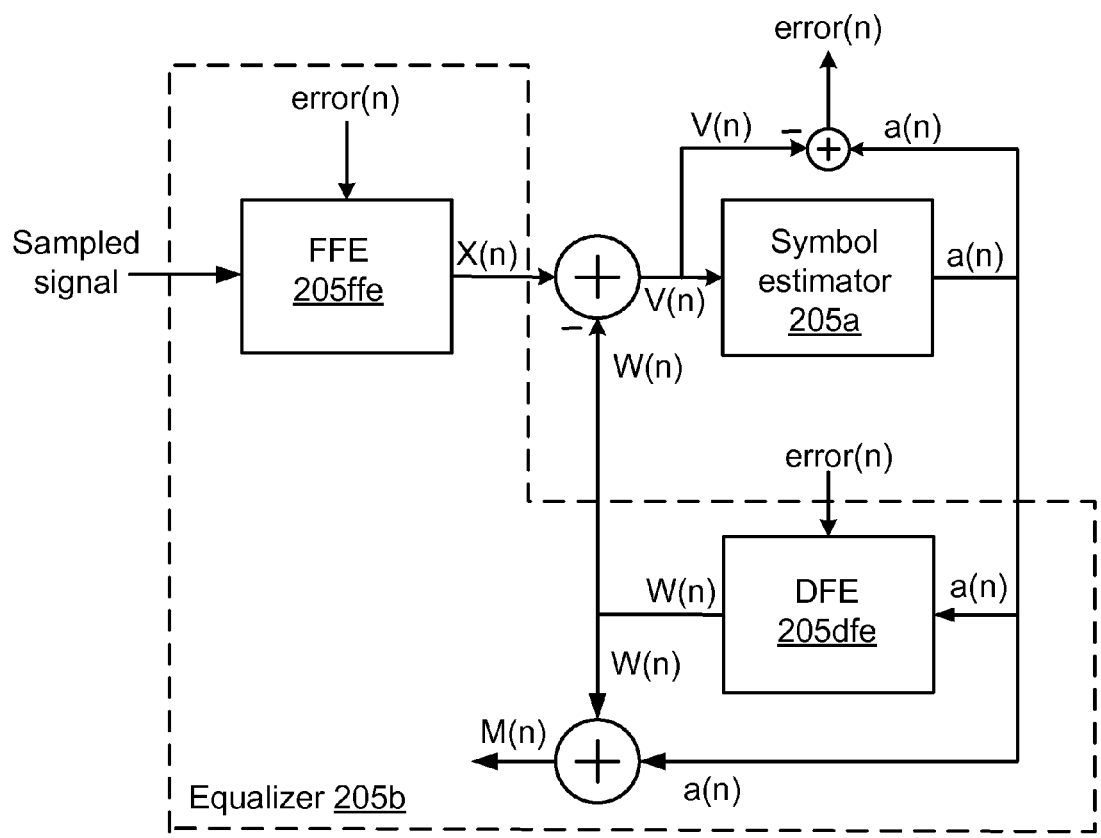
FIG. 5 illustrates one embodiment of an equalizer and a symbol estimator.

FIG. 5 illustrates one embodiment in which the equalizer 205b includes a Feed-Forward Equalizer (FFE) 205ffe having a constraint facilitating lower inter-symbol interference at least when activating the FFE 205ffe, wherein the constraint is based on the fact that transmission is done over a wire medium. In one embodiment, the constraint is achieved by associating the main and first pre-cursor coefficients of the FFE 205*ffe*. In one embodiment, the equalizer 205*b* includes a Decision-Feedback Equalizer (DFE) 205*dfe*. A receiver including equalizer 205*b* and symbol estimator 205*a* will converge into an optimal Minimum Mean Square Error (MMSE) solution, considering best phase sampling point. Because MMSE solution guarantees minimum BER requirement, MMSE is a practical way to implement a Maximum Likelihood Sequence Estimator (MLSE) solution. In some embodiments, a combination of both solutions may be implemented.

Figure 6A:
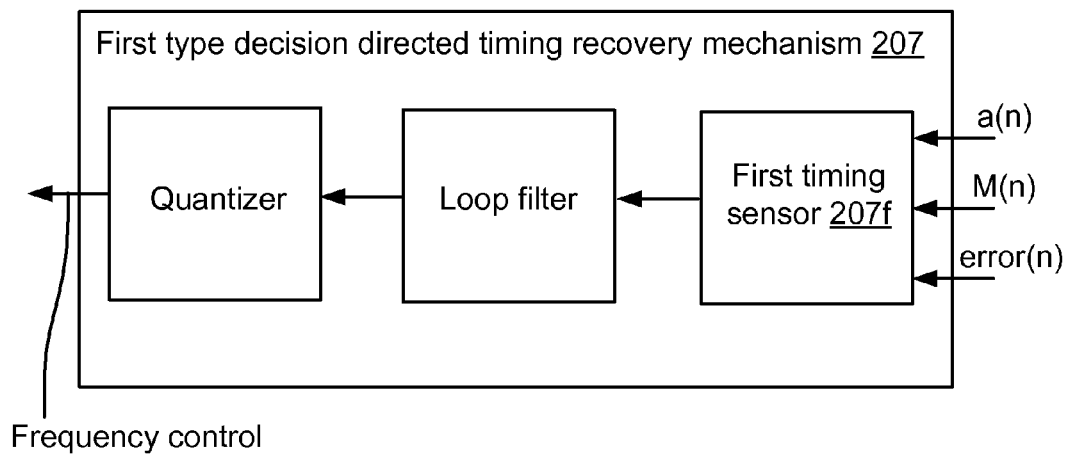
FIG. 6A illustrates one embodiment of a first type decision directed timing recovery mechanism.
Figure 6B:
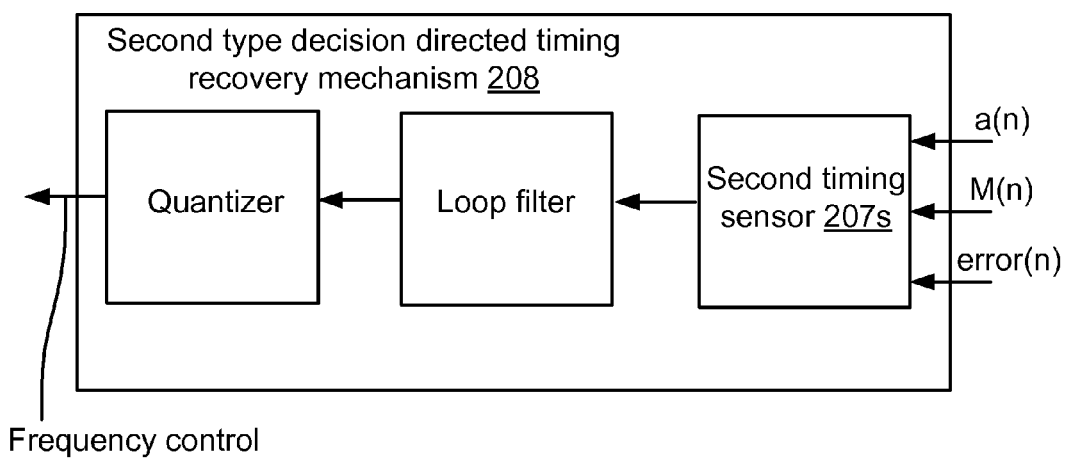
FIG. 6B illustrates one embodiment of a second type decision directed timing recovery mechanism.

FIG. 6A illustrates one embodiment in which the first type decision-directed timing recovery mechanism 207 includes a first timing detector 207*f* which is based on the estimation of g(−1)−k*g(1), wherein g(n) denotes the impulse response of the twisted pair wire and equalizer 205*b* at time n, k denotes a constant value having a range between 1.5 and 5, and the first timing detector 207*f* facilitates fast convergence into the third frequency. Alternatively, the constant value having a range between 1+epsilon and 5. FIG. 6B illustrates one embodiment in which the second type decision-directed timing recovery mechanism 208 includes a second timing detector 207*s* which is based on the estimation of g(−1)−g(1), wherein g(n) denotes the impulse response of the wire channel and equalizer at time n, and the second timing detector 207*s* facilitates accurate phase-locking of the second local clock 202 to substantially the best phase that assures optimal MMSE solution, and therefore lower the BER. In one embodiment, equalizer 205*b* includes a Feed-Forward Equalizer (FFE) 205*ffe*, a Decision-Feedback Equalizer (DFE) 205*dfe*, and a symbol estimator 205*a*, and g(−1)−g(1) is estimated using the expression [M(n)−M(n−2)]*e(n−1), wherein M(n) equals W(n)+a(n), a(n) is the estimation of symbols at the output of the symbols estimator 205*a*, W(n) is the output of the DFE 205*dfe*, e(n) equals a(n)−V(n), V(n) equals X(n)−W(n), and X(n) is the output of the FFE 205*ffe*. In one embodiment, k equals 2, and g(−1)−k*g(1) is estimated using the expression [M(n)−M(n−2)]*e(n−1)−[(a(n)−a(n−1))*e(n)], the g(−1)-k*g(1) is estimated by E{[M(n)−M(n−2)]*e(n−1)−[(a(n)−a(n−1))*e(n)]}, the E denotes expectancy, and it is performed by a Loop Filter averaging characteristic.

In one embodiment, the third frequency substantially equals the first free running frequency. In one embodiment, the third frequency is within +/−10 PPM of the first free running frequency. In one embodiment, the third frequency is within +/−2 PPM of the first free running frequency.

In one embodiment, a two-level decision metric is used in conjunction with the first type decision-directed timing recovery mechanism 207, during decreasing of the frequency of the second local clock 202 to a third frequency value, in order to facilitate convergence into the third frequency. In one embodiment, a multiple-level decision metric is used in conjunction with the second type decision-directed timing recovery mechanism 208, after phase-locking the second local clock 202 to the optimal phase under MMSE criteria, in order to facilitate accurate symbol estimation.

In one embodiment, transceiver 100 operates in an environment featuring cross-talk and Additive white Gaussian noise (AWGN). In one embodiment, the second local clock 202 is used to transmit back signal 105 featuring symbols from the receiver 102 to the transmitter 101, after the second local clock 202 is frequency-locked with the first local clock 201. In one embodiment, analog front end (AFE) 203 samples signal 104 at a rate of substantially one sample per one symbol conveyed over twisted pair wire 301.

In one embodiment, a first inherent frequency inaccuracy of a first local clock 201 belonging to a transmitter 101 is determined, and a second inherent frequency inaccuracy of a second local clock 202 belonging to a receiver 102 is determined. A first free running frequency of the first local clock 201 is assured to be higher than a second free running frequency of the second local clock 202, by intentionally setting the difference between the first free running frequency and the second free running frequency to a value that is higher than the sum of the first inherent inaccuracy and the second inherent inaccuracy. The first free running frequency is then used to generate symbols at the transmitter, and the symbols are received at the receiver. The receiver 102 then increases the frequency of second local clock 202 to a third frequency value that is closer to the first free running frequency, using a first type decision-directed timing recovery mechanism 207 that is intentionally limited to only increasing and not decreasing the frequency of the second local clock 202. The limitation of the first type decision-directed timing recovery mechanism assures convergence into the third frequency value under substantial inter-symbol interference conditions. After the third frequency is reached, the first type decision-directed timing recovery mechanism 207 is disabled, and a second type decision-directed timing recovery mechanism 208, which is not limited to only increasing the frequency of the second local clock, is used to phase-lock the second local clock 202 to the optimal phase under MMSE criteria.

In one embodiment, a system for assuring acquisition of symbol timing in a full-duplex data transceiver 100, under inter-symbol interference conditions, includes a transmitter 101 having a first local clock 201 featuring a first free running frequency, and a receiver 102. The receiver 102 includes a second local clock 202 having a second frequency that is initially set to a value higher than the first free running frequency, a first type decision-directed timing recovery mechanism 207 that is intentionally limited to only decreasing and not increasing the frequency of the second local clock 202, and a second type decision-directed timing recovery mechanism 208 that is not limited to only decreasing the frequency of the second local clock 202. The receiver receives from the transmitter symbols generated using the first local clock 201, and then decreases the frequency of the second local clock 202 to a third frequency value that is closer to the first free running frequency using the first type decision-directed timing recovery mechanism 207. The receiver then disables the first type decision-directed timing recovery mechanism 207 after reaching the third frequency value, and then phase-locks the second local clock 202 to the optimal phase under MMSE criteria using a second type decision-directed timing recovery mechanism 208. The limitation of the first type decision-directed timing recovery mechanism 207 is operative to assure convergence into the third frequency value under substantial inter-symbol interference conditions.

In one embodiment, a system for assuring acquisition of symbol timing in a full-duplex data transceiver 100, under inter-symbol interference conditions, includes a transmitter 101 having a first local clock 201 featuring a first free running frequency, and a receiver 102. The receiver 102 includes a second local clock 202 having a second frequency that is initially set to a value lower than the first free running frequency, a first type decision-directed timing recovery mechanism 207 that is intentionally limited to only increasing and not decreasing the frequency of the second local clock 202, and a second type decision-directed timing recovery mechanism 208 that is not limited to only increasing the frequency of the second local clock 202. The receiver receives from the transmitter symbols generated using the first local clock 201, and then increases the frequency of the second local clock 202 to a third frequency value that is closer to the first free running frequency using the first type decision-directed timing recovery mechanism 207. The receiver then disables the first type decision-directed timing recovery mechanism 207 after reaching the third frequency value, and then phase-locks the second local clock 202 to the optimal phase under MMSE criteria using a second type decision-directed timing recovery mechanism 208. The limitation of the first type decision-directed timing recovery mechanism 207 is operative to assure convergence into the third frequency value under substantial inter-symbol interference conditions.

Figure 7A:
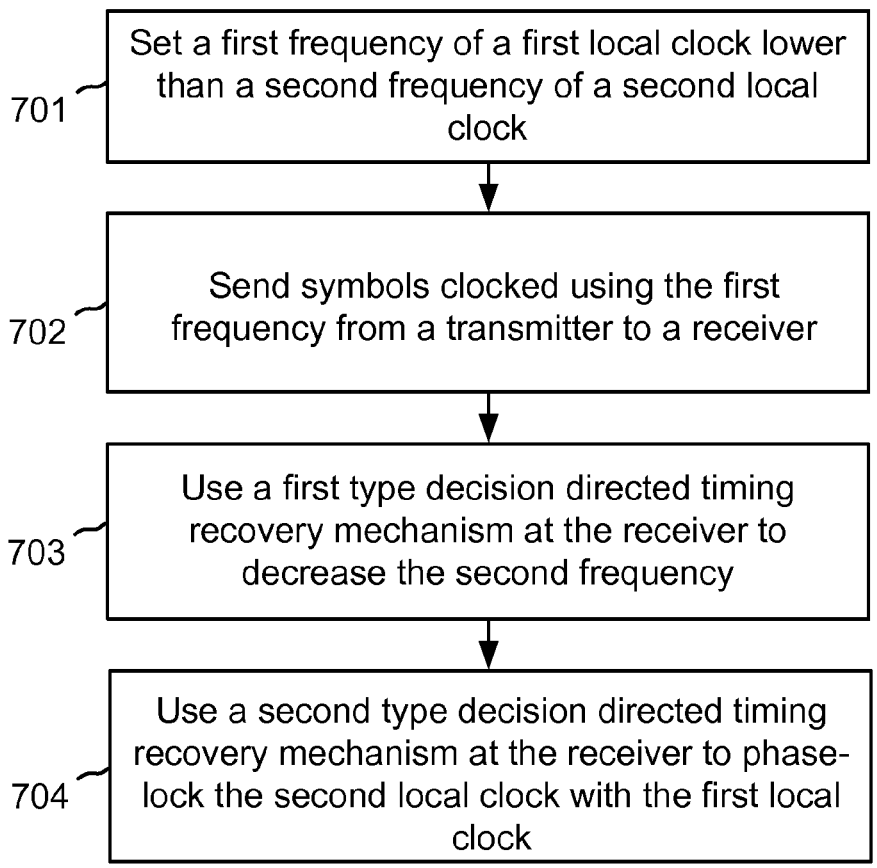
FIG. 7A is a flow diagram describing one embodiment of using a first type decision directed timing recovery mechanism and a second type decision directed timing recovery mechanism.

FIG. 7A illustrates a flow diagram describing one method for phase-locking a second local clock with a first local clock, comprising the following steps: In step 701, setting a first frequency of a first local clock lower than a second frequency of a second local clock. In step 702, sending symbols clocked using the first frequency from a transmitter to a receiver. In step 703, using a first type decision directed timing recovery mechanism at the receiver to decrease the second frequency, wherein the first type decision directed timing recovery mechanism is limited to only decreasing the second frequency. In step 704, using a second type decision directed timing recovery mechanism at the receiver to phase-lock the second local clock to the optimal phase under MMSE criteria, wherein the second type decision directed timing recovery mechanism is not limited to only decreasing the second frequency.

Figure 7B:
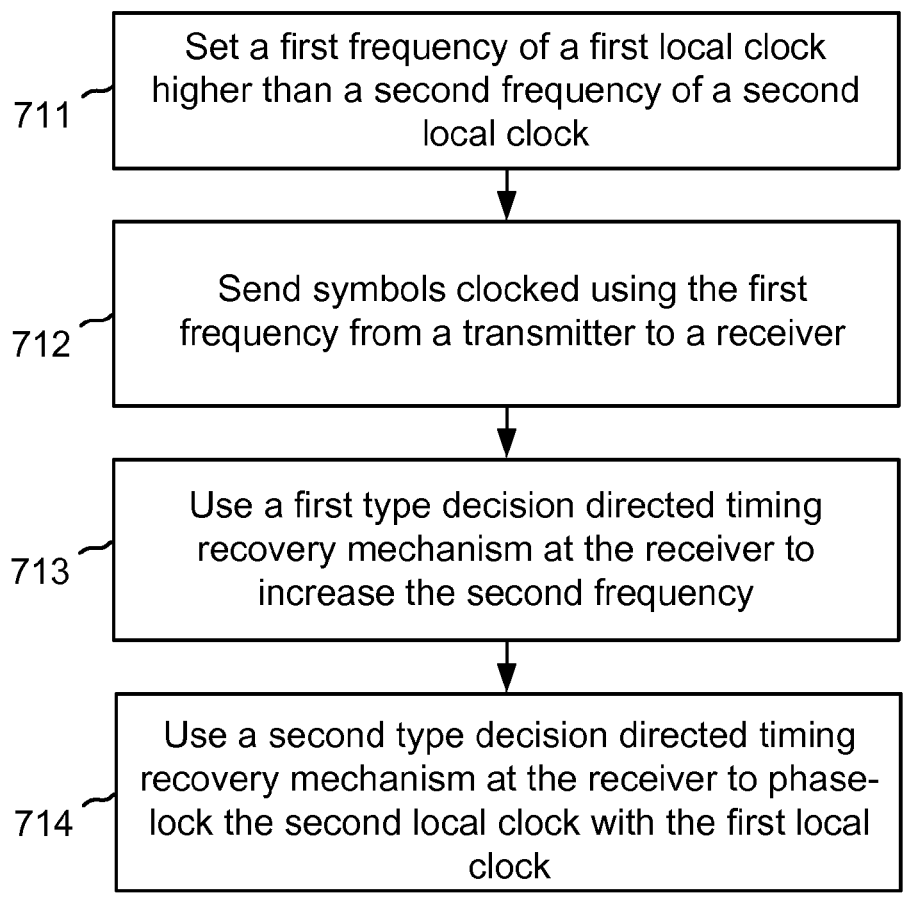
FIG. 7B is a flow diagram describing one embodiment of using a first type decision directed timing recovery mechanism and a second type decision directed timing recovery mechanism.

FIG. 7B illustrates a flow diagram describing one method for phase-locking a second local clock with a first local clock, comprising the following steps: In step 711, setting a first frequency of a first local clock higher than a second frequency of a second local clock. In step 712, sending symbols clocked using the first frequency from a transmitter to a receiver. In step 7133, using a first type decision directed timing recovery mechanism at the receiver to increase the second frequency, wherein the first type decision directed timing recovery mechanism is limited to only increasing the second frequency. In step 714, using a second type decision directed timing recovery mechanism at the receiver to phase-lock the second local clock to the optimal phase under MMSE criteria, wherein the second type decision directed timing recovery mechanism is not limited to only increasing the second frequency.

In one embodiment, a receiver receives and de-modulates a high modulation training sequence transmitted by a transmitter to the receiver under inter-symbol interference conditions. The training sequence is used by the receiver to converge two close loop mechanisms necessary for correct reception of high modulation signals. The first close loop is a timing recovery mechanism, and the second closed loop is an equalizer mechanism. However, in order to facilitate convergence of the two open loop mechanisms under inter-symbol interference conditions, the training sequence must conform to two apparently conflicting requirements: (i) on one hand, the training sequence must include a low-modulation symbol sequence in order to allow the timing recovery mechanism a fast and accurate convergence into correct frequency sync under starting conditions where strong frequency drift and inter-symbol interference rule, (ii) but on the other hand, the training sequence must include a symbol sequence featuring both high modulation symbols and low modulation symbols in order to allow the equalizer mechanism a fast and accurate convergence into final signal equalization (elimination of inter-symbol interference). The training sequence is therefore constructed as a hybrid training sequence as follows: (i) the training sequence is predominantly made of low modulation symbols facilitating reduction of frequency drift and timing recovery, (ii) a minority high level modulation symbols are scattered across the training sequence, alongside the abundant low modulation symbols. These minority high level modulation symbols facilitate convergence of the equalizer into high modulation symbol equalization, once frequency drift compensation is achieved. The hybrid training sequence is used by the received as follows: (i) the receiver first employs a first symbol estimator having a two-level decision metric. The first symbol estimator produce symbol estimations able to support fast reduction of frequency drift by the timing recovery mechanism. (ii) The receiver then switches to a second symbol estimator having a multi-level decision metric. The second symbol estimator produces symbol estimations able to support fast convergence of the equalizer into multi-level symbol equalization. On the one hand, the high modulation symbols are rare enough to substantially not interfere with reduction of frequency drift by the timing and recovery mechanism. On the other hand, the high modulation symbols are abundant enough to substantially allow reaching steady state signal equalization by the equalizer.

FIG. 8A, FIG. 8B, FIG. 9A, FIG. 9B, FIG. 10, FIG. 12, and FIG. 13 illustrate embodiments of a communication system and associated signals for frequency drift compensation and signal equalization using a single training sequence. In one embodiment, a training sequence 901 (illustrated in FIG. 10) is received by receiver 802 as a signal 804 (illustrated in FIG. 8A and FIG. 8B). The training sequence 901 includes symbols 902 belonging to a single modulation scheme. At least 99% of symbols 902 are symbols having low symbol levels, illustrated as symbols 907 in FIG. 10. At most 1% of symbols 902 are symbols having high symbol levels, illustrated as symbols 905. Symbols 905, having high symbol levels, are substantially homogenously scattered over the training sequence 901. It is noted that although training sequence 901 is illustrated as a short sequence of symbols, it is typically a much longer sequence including thousands of symbols, of even hundreds of thousands of symbols.

A two-level decision metric is used, in conjunction with a first symbol estimator 805s1, to estimate symbols 902. According to one example, the following two-level decision metric is used by symbol estimator 805s1: if the a received signal 804 associated with a symbol is positive, then the symbol is estimated to be a symbol having a low symbol level that is positive; if the a received signal 804 associated with a symbol is negative, then the symbol is estimated to be a symbol having a low symbol level that is negative. It is noted that the intentional use of a two-level decision metric causes symbols 905 (which have high symbol levels) to be erroneously estimated to be symbols having low symbol levels. However, since symbols 905 are the minority and symbols 907 are the majority, then most symbols 902 (namely symbols 907) are correctly estimated using the two-level decision metric. The fact that most of symbols 902 are correctly estimated using a two-level decision metric means that training sequence 901 may be used to feed the receiver 802 during a process of frequency drift reduction. In other words, the minority symbols 905, which are estimated incorrectly by the symbol estimator 805s1, are too scarce to adversely affect the process of frequency drift reduction. Symbols 905 are later used for converging the signal equalization process.

A timing recovery mechanism 808 (illustrated in FIG. 8B) uses the estimated symbols, produced at receiver 802 by the first symbol estimator 805s1, to continuously reduce a frequency drift between the receiver 802 and a transmitter 801 transmitting the training sequence 901 to receiver 802. It is noted that a two-level decision metric symbol estimator, such as symbol estimator 805s1, is required in order to successfully reduce the frequency drift under adverse communication conditions such as inter-symbol interference and noise. A multiple-level decision metric symbol estimator may fail to successfully reduce frequency drift under adverse communication conditions.

After a desirable frequency drift is achieved by timing recovery mechanism 808, or after satisfying any other appropriate criterion, receiver 802 switches from the first symbol estimator 805s1 to a second symbol estimator 805s2 featuring a multiple-level decision metric. This is necessary in order to allow an equalizer 805b to eliminate inter-symbol interference and achieve signal equalization for symbols of high modulation schemes such as PAM4, PAM8, or PAM16. It is noted that during the switch, and after the switch, the training sequence 901 is still being received by receiver 802.

Figure 8A:
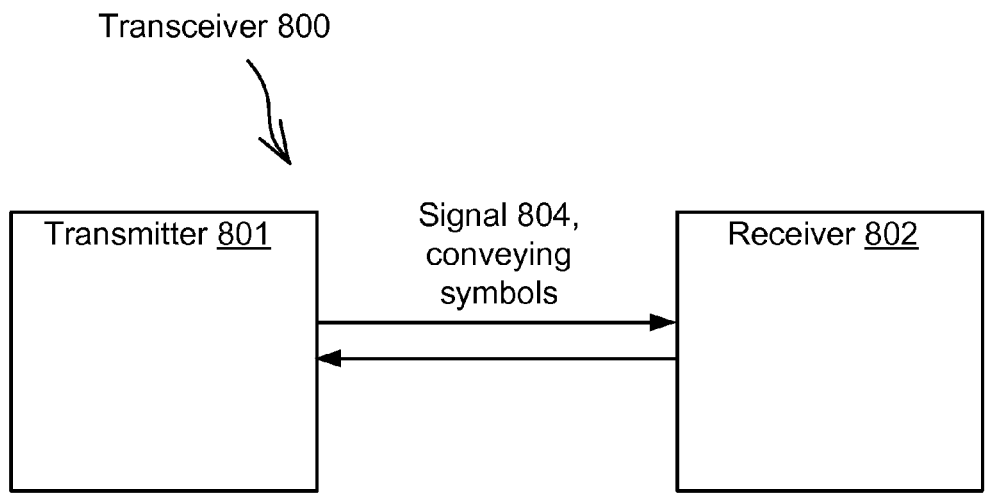
FIG. 8A illustrates one embodiment of a transceiver.
Figure 8B:
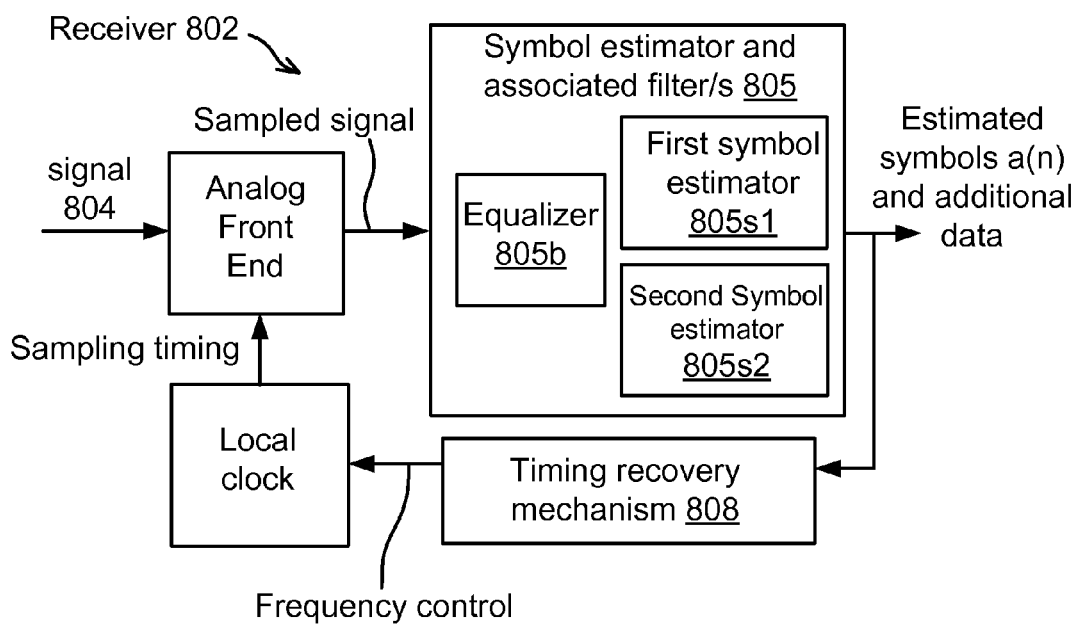
FIG. 8B illustrates one embodiment of a receiver.
Figure 9A:
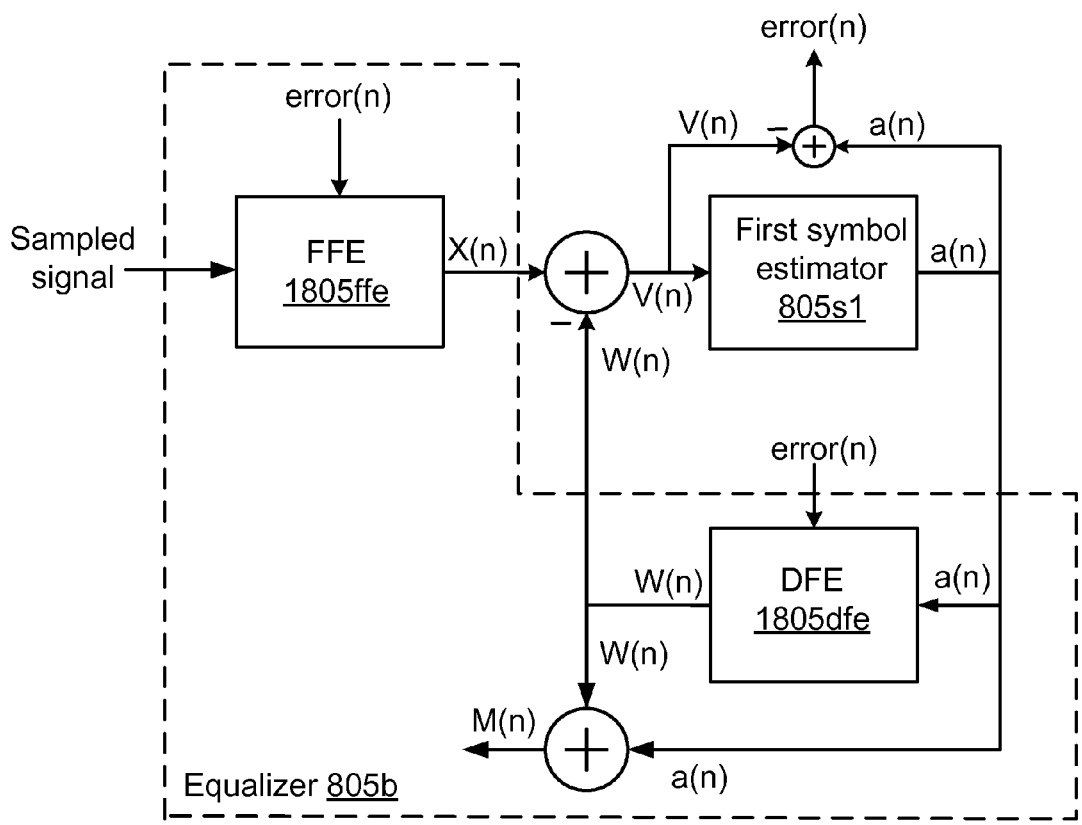
FIG. 9A illustrates one embodiment of a first symbol estimator.
Figure 9B:
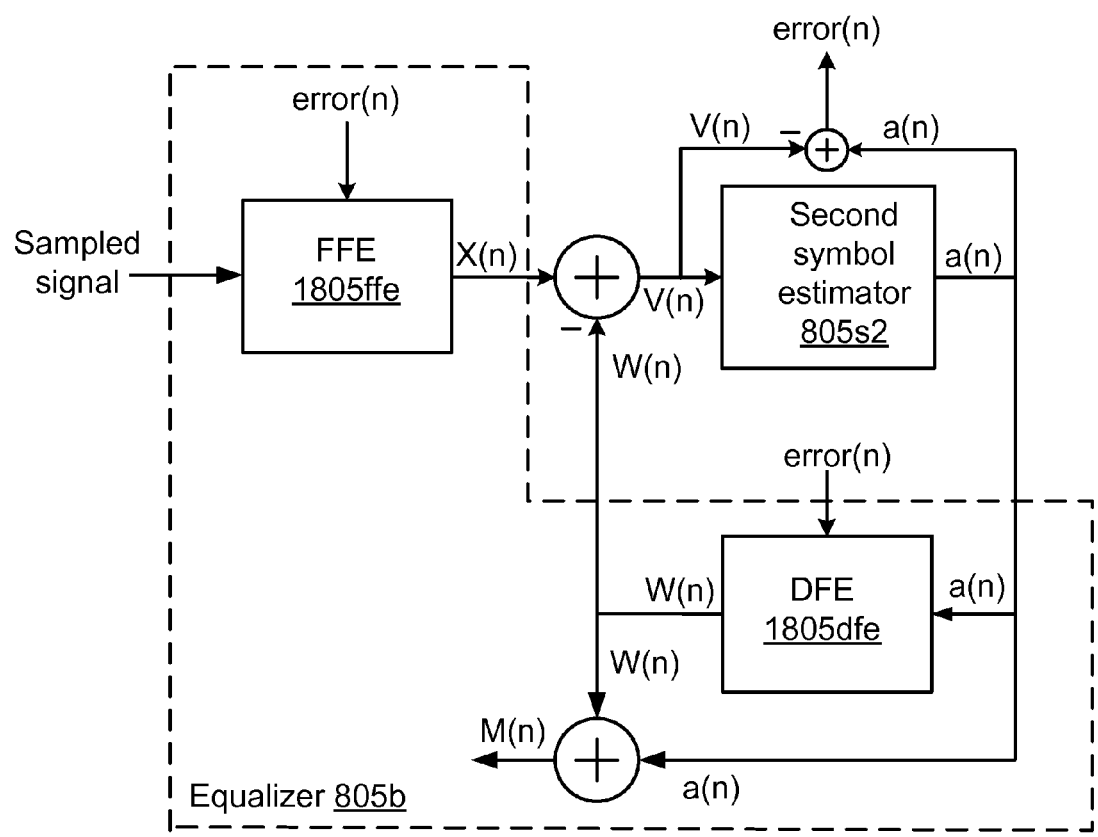
FIG. 9B illustrates one embodiment of a second symbol estimator.
Figure 10:
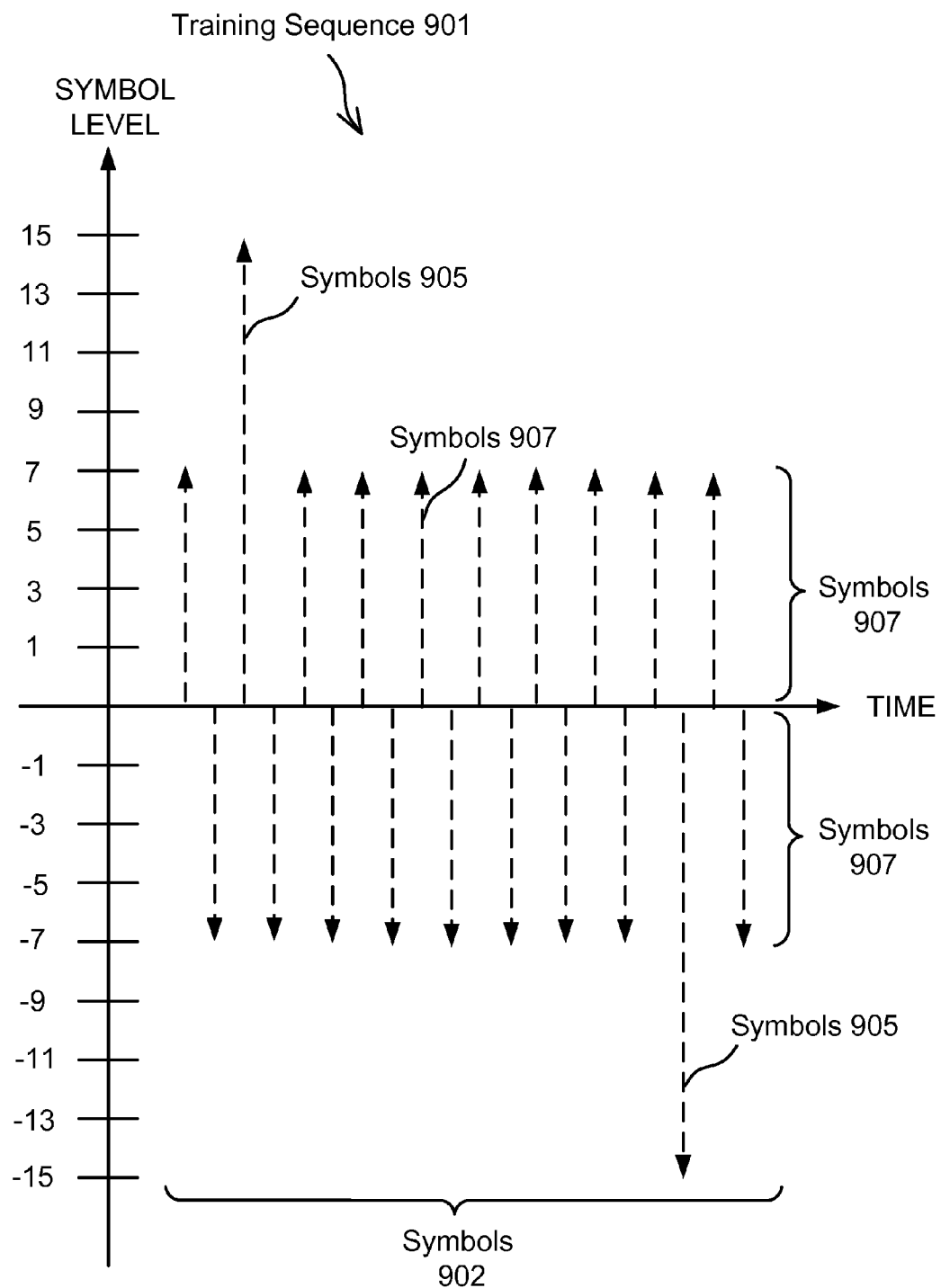
FIG. 10 illustrates one embodiment of a training sequence.

Equalizer 805b converges to steady-state signal equalization, or near steady-state signal equalization, using the symbols estimated from the training sequence 901 by the second symbol estimator 805s2, illustrated in FIG. 8B and FIG. 9B. It is noted that a multiple-level decision metric symbol estimator, such as symbol estimator 805s2, must be used in order to equalize a signal of high modulation schemes. A two-level decision metric symbol estimator, such as the symbol estimator 805s1, may not be used to equalize signals of high modulation schemes, such as PAM4, PAM8, or PAM16 signals. It is further noted that the rare symbols 905, having high symbol levels, are still present in sufficient numbers in order to allow the convergence of equalizer 805b. When training sequence 901 is over, equalizer 805b is converged, and an actual high modulation data transmission may commence.

It is noted that no feedback is needed from receiver 802 to transmitter 801, nor does changing of the training sequence is required. The frequency drift and inter-symbol interference are eliminated using only one type of training sequence.

In one embodiment, the low symbol levels of symbols 907 correspond to the mid symbol levels of PAM4 modulation and the high symbol levels of symbols 905 correspond to the high symbol levels of PAM4 modulation. In one embodiment, the low symbol levels of symbols 907 correspond to the mid symbol levels of PAM8 modulation and the high symbol levels of symbols 905 correspond to the high symbol levels of PAM8 modulation. In one embodiment, the low symbol levels of symbols 907 correspond to the mid symbol levels of PAM16 modulation and the high symbol levels of symbols 905 correspond to the high symbol levels of PAM16 modulation.

In one embodiment, some of the symbols of the training sequence 901 are negative and some of the symbols of the training sequence are positive, creating a sequence featuring substantial number of transitions between positive and negative symbols. The transitions facilitated convergence of timing recovery mechanism 808, and elimination of frequency drift.

In one embodiment, a transmitter 801 transmits a training sequence 901 featuring symbols 902 belonging to a single modulation scheme, wherein at least 90% of symbols 902 have low symbol amplitude and either a positive or negative sign, and at most 10% of symbols 902 have high symbol amplitude and either a positive or negative sign.

According to one example, the positive low symbol amplitude is 7 units, the negative low symbol amplitude is −7 units, the positive high symbol amplitude is 15 units, and the negative high symbol amplitude is −15 units. The units of the symbol amplitude may refer to voltage levels, logical symbol levels, power levels, or any measurable parameter, either normalized or unnormalized, typically associated with symbol sizing. A receiver 802 receives symbols 902. A first symbol estimator 805s1 estimates symbols 902. Each of symbols 902 is estimated to either the low symbol amplitude having a positive sign, or the low symbol amplitude having a negative sign, depending substantially only on the sign of the received symbols 902, and substantially disregarding symbols 902 amplitude. A timing recovery mechanism 808 estimates symbols 902 in order to continuously reduce a frequency drift between receiver 802 and transmitter 801. The first symbol estimator 805s1 is switched off and a second symbol estimator 805s2 is switched on according to a certain criterion. It is noted that the switch from symbol estimator 805s1 to symbol estimator 805s2 may be done by either physically switching between two separate symbol estimator components, or by changing the way an initial symbol estimator component operates, or using any other appropriate technique. The second symbol estimator 805s2 estimates symbols 902 belonging to training sequence 901. Each of symbols 902 is estimated to either the low symbol amplitude having a positive or negative sign, or the high symbol amplitude having a positive or negative sign. An equalizer 805b uses the symbols estimated by the second symbol estimator 805s2 to converge, achieve signal equalization, and eliminate inter-symbol interference.

In one embodiment, symbols 902 substantially alternate between positive and negative values, and the symbols 905, which have a high symbol amplitude, are substantially homogeneously scattered over training sequence 901. Homogeneously scattering symbols 905 may be achieved by either random or pseudo-randomly placing symbols 905 in different symbol locations along training sequence 901, or by placing symbols 905 along training sequence 901 using predetermined symbol separation.

In one embodiment, receiver 802 operates under inter-symbol interference conditions, and the estimation characteristics of the first symbol estimator 805s1 allow the timing recovery mechanism 808 to continuously reduce the frequency drift between the receiver 802 and the transmitter 801 substantially regardless of the inter-symbol interference conditions. A training sequence containing mostly symbols of low-modulation level, such as training sequence 901, allows timing recovery mechanism 808 to reduce frequency drift under inter-symbol interference conditions, provided that the first symbol estimator 805s1 is in use.

In is noted that during the operation of the first symbol estimator 805s1, the equalizer 805b is substantially unable to converge to a steady state signal equalization, because the first symbol estimator 805s1 is intentionally not estimating high modulation levels that are required to enable equalizer 805b equalize symbols of high modulation. The equalizer 805b is able to converge to steady state signal equalization substantially only after switching from the first symbol estimator 805s1 to the second symbol estimator 805s2.

In one embodiment, the at most 10% of symbols 902, having a high symbol amplitude, are rare enough to substantially not interfere with reduction of frequency drift by timing and recovery mechanism 808. In one embodiment, the at most 10% of the symbols 902, having a high symbol amplitude, are abundant enough to substantially allow reaching steady state signal equalization by equalizer 805b.

In one embodiment, the symbols 905 having high symbol amplitude are at most 1% of the symbols 902, and the symbols 907 having low symbol amplitude are at least 99% of the symbols 902. In one embodiment, the transmitter 801 is coupled to the receiver 802 via a twisted-pair wire, the symbols 902 are transmitted at a rate of at least 125 million symbols per second, and therefore the receiver 802 includes the equalizer 805b operative to reduce inter-symbol interference. In one embodiment, the equalizer 805b includes a Feed-Forward Equalizer (FFE) 805ffe (illustrated in FIG. 9A and FIG. 9B) having a fixed value ratio between the cursor coefficient of the FFE and the first pre-cursor coefficient of the FFE.

Figure 12:
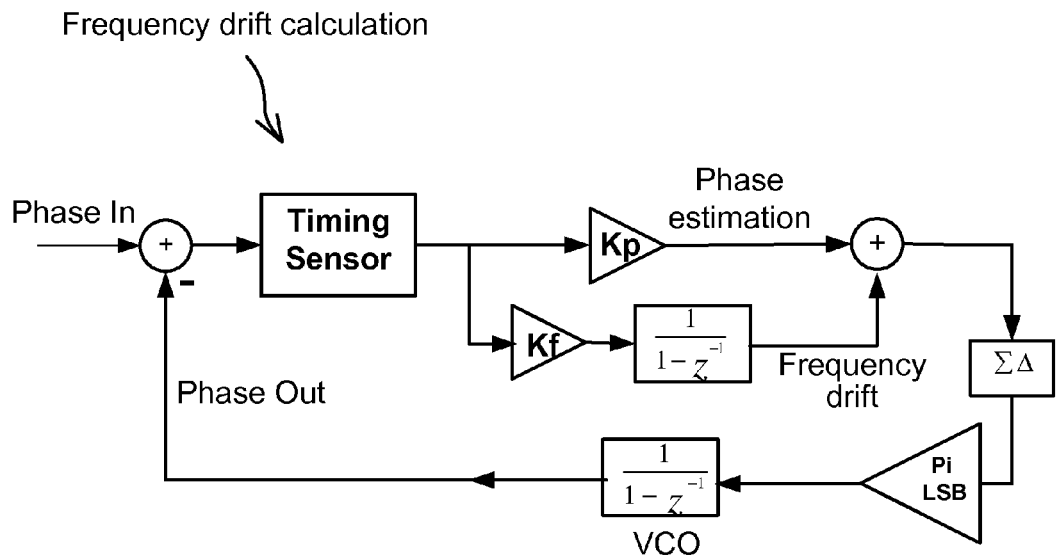
FIG. 12 illustrates one embodiment of calculating frequency drift.

In one embodiment, the certain criterion, for switching from the first symbol estimator 805s1 to a second symbol estimator 805s2, is a frequency drift criterion. The frequency drift may be calculated by the timing recovery mechanism 808, and the switch may occur when the calculated frequency drift drops below a certain level. FIG. 12 illustrates one embodiment of calculating frequency drift. Frequency drift may be calculated using various methods and estimators.

Figure 13:
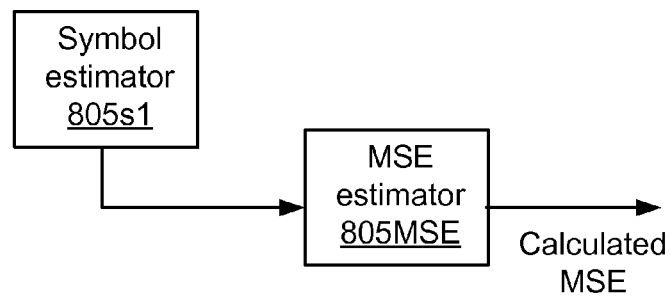
FIG. 13 illustrates one embodiment of calculating Mean Square Error (MSE)

In one embodiment, the certain criterion, for switching from the first symbol estimator 805s1 to a second symbol estimator 805s2, is a Mean Square Error (MSE) criterion, calculated using symbols estimated by the first symbol estimator 805s1. The switch may occur when the calculated MSE drops below a certain level. FIG. 13 illustrates one embodiment of calculating the MSE using an MSE estimator 805MSE.

FIG. 8B illustrated one embodiment in which timing recovery mechanism 808 is a first type decision-directed timing recovery mechanism, which is intentionally limited to only decreasing and not increasing the frequency drift. The first type decision-directed timing recovery mechanism is used during the operation of the first symbol estimator. The limitation of the first type decision-directed timing recovery mechanism assures reduction of the frequency drift under inter-symbol interference conditions. During the operation of the second symbol estimator 805s2, a phase-lock condition may be achieved using a second type decision-directed timing recovery mechanism, which is not limited to only decreasing the frequency drift. The frequency drift may be intentional.

In one embodiment, timing recovery mechanism 808 is a first type decision-directed timing recovery mechanism, which is intentionally limited to only increasing and not decreasing the frequency drift. The first type decision-directed timing recovery mechanism is used during the operation of the first symbol estimator. The limitation of the first type decision-directed timing recovery mechanism assures reduction of the frequency drift under inter-symbol interference conditions. During the operation of the second symbol estimator 805s2, a phase-lock condition may be achieved using a second type decision-directed timing recovery mechanism, which is not limited to only increasing the frequency drift. The frequency drift may be intentional.

Figure 11:
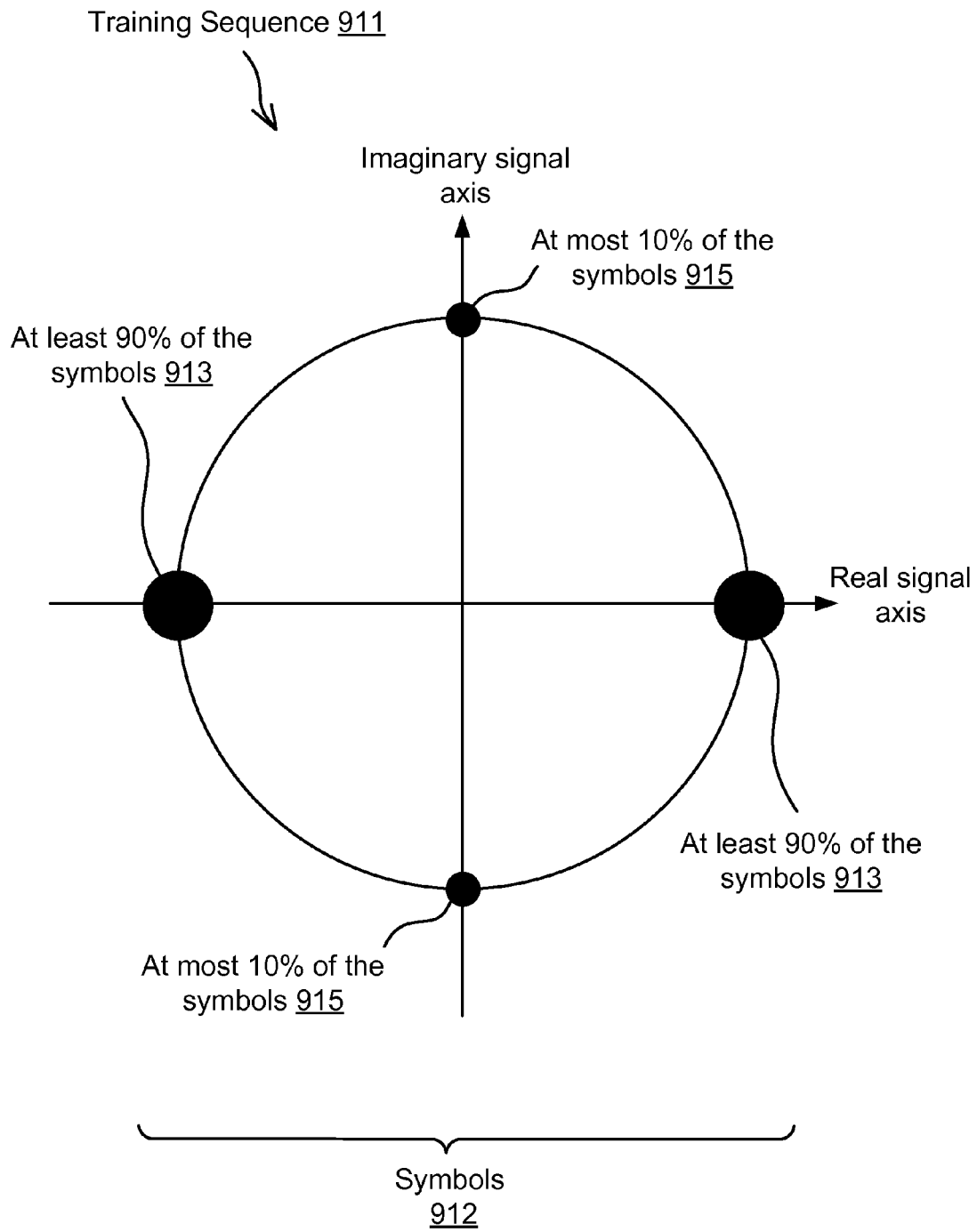
FIG. 11 illustrates one embodiment of a training sequence.

FIG. 11 illustrates one embodiment of a Phase Shift Key (PSK) symbols belonging to a single training sequence, facilitating frequency drift compensation and signal equalization. A training sequence 911 includes symbols 912 belonging to a single modulation scheme. At least 90% of symbols 912 are located on a real signal axis, as illustrated by symbols 913. At most 10% of symbols 912 are located on an imaginary signal axis, as illustrated by symbols 915, and are substantially homogenously scattered over the training sequence 911. A two-phase decision metric is used, in conjunction with a first symbol estimator to estimate symbols 912. A timing recovery mechanism uses the estimated symbols to continuously reduce a frequency drift between the receiver and a transmitter transmitting the training sequence to the receiver. The first symbol estimator is switched to a second symbol estimator having a multiple-phase decision metric, according to a certain criterion. An equalizer is converged using the symbols estimated by the second symbol estimator. In one embodiment, some of the symbols of training sequence 911 are negative and some of the symbols are positive, creating a sequence featuring substantial number of transitions between positive and negative symbols.

Figure 14:
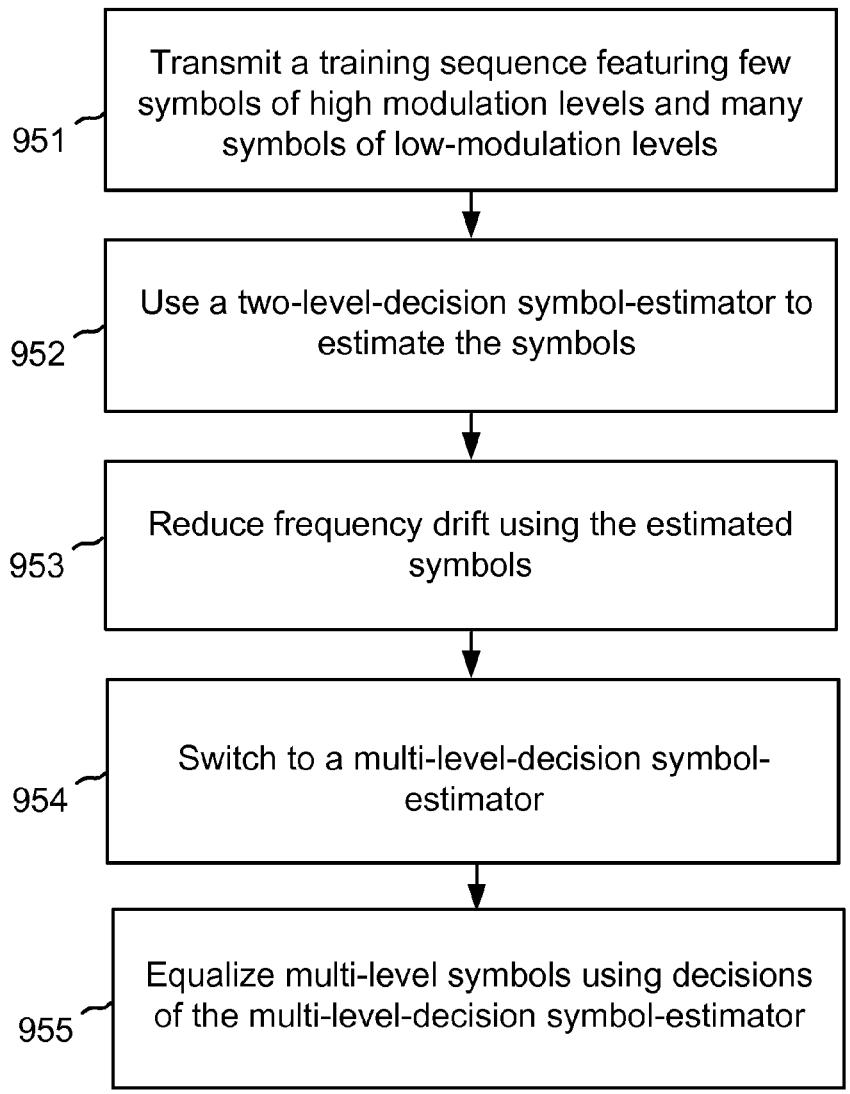
FIG. 14 is a flow diagram describing one embodiment of reducing frequency drift and equalizing multi-level symbols.

FIG. 14 illustrates a flow diagram describing one method for reducing frequency drift and equalizing multi-level symbols: In step 951, transmitting, by a transmitter, a training sequence featuring few symbols of high modulation levels and many symbols of low-modulation levels. In step 952, using a two-level-decision symbol-estimator to estimate the symbols at a receiver receiving the training sequence. In step 953, reducing frequency drift between the transmitter and the receiver, at the receiver, using the estimated symbols. In step 954, switching, by the receiver, from the two-level-decision symbol-estimator to a multi-level-decision symbol-estimator. And in step 955, equalizing multi-level symbols, at the receiver, using decisions made by the multi-level-decision symbol-estimator.

Figure 15:
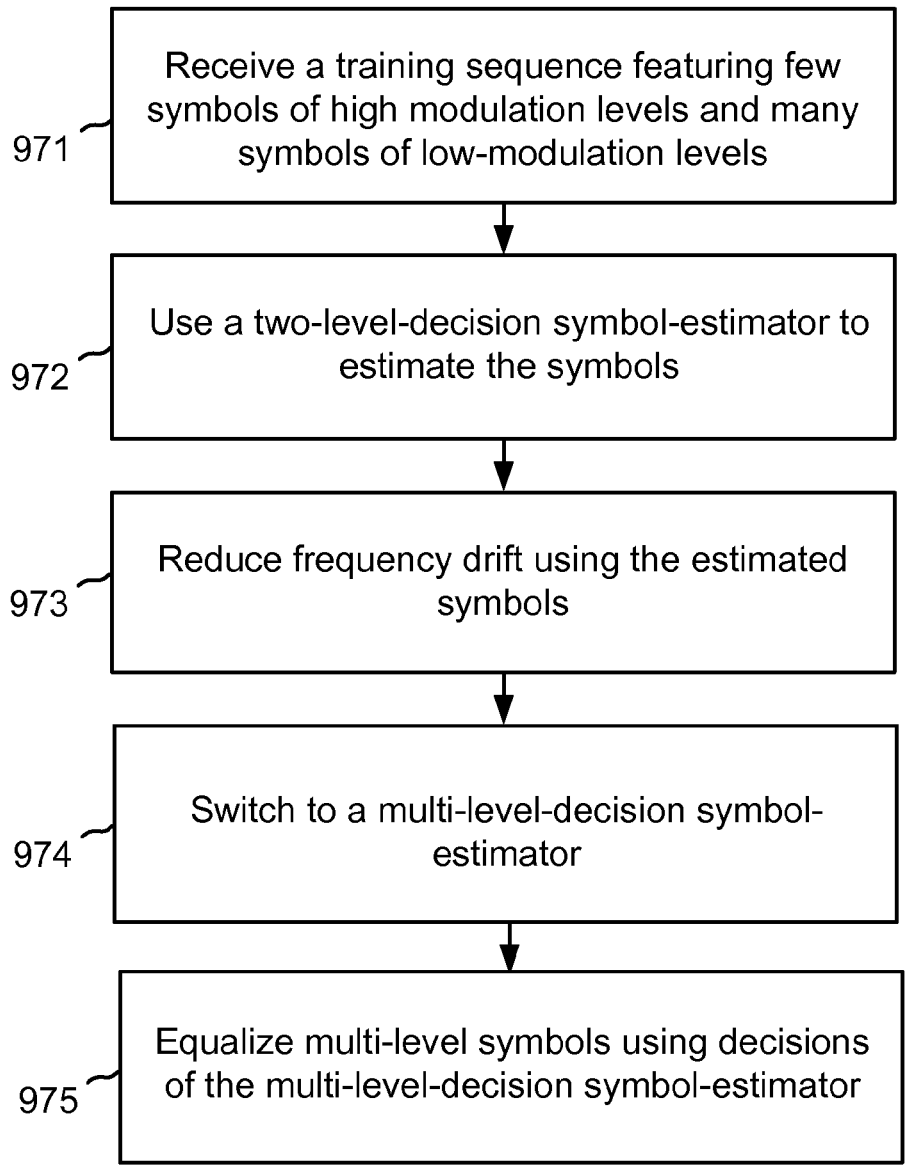
FIG. 15 is a flow diagram describing one embodiment of reducing frequency drift and equalizing multi-level symbols.

FIG. 15 illustrates a flow diagram describing one method for reducing frequency drift and equalizing multi-level symbols: In step 971, receiving, by a receiver, a training sequence featuring few symbols of high modulation levels and many symbols of low-modulation levels. In step 972, using a two-level-decision symbol-estimator to estimate the symbols. In step 973, reducing frequency drift between a transmitter that transmitted the training sequence and the receiver, using the estimated symbols. In step 974, switching from the two-level-decision symbol-estimator to a multi-level-decision symbol-estimator. And in step 975, equalizing multi-level symbols using decisions made by the multi-level-decision symbol-estimator.

Figure 16:
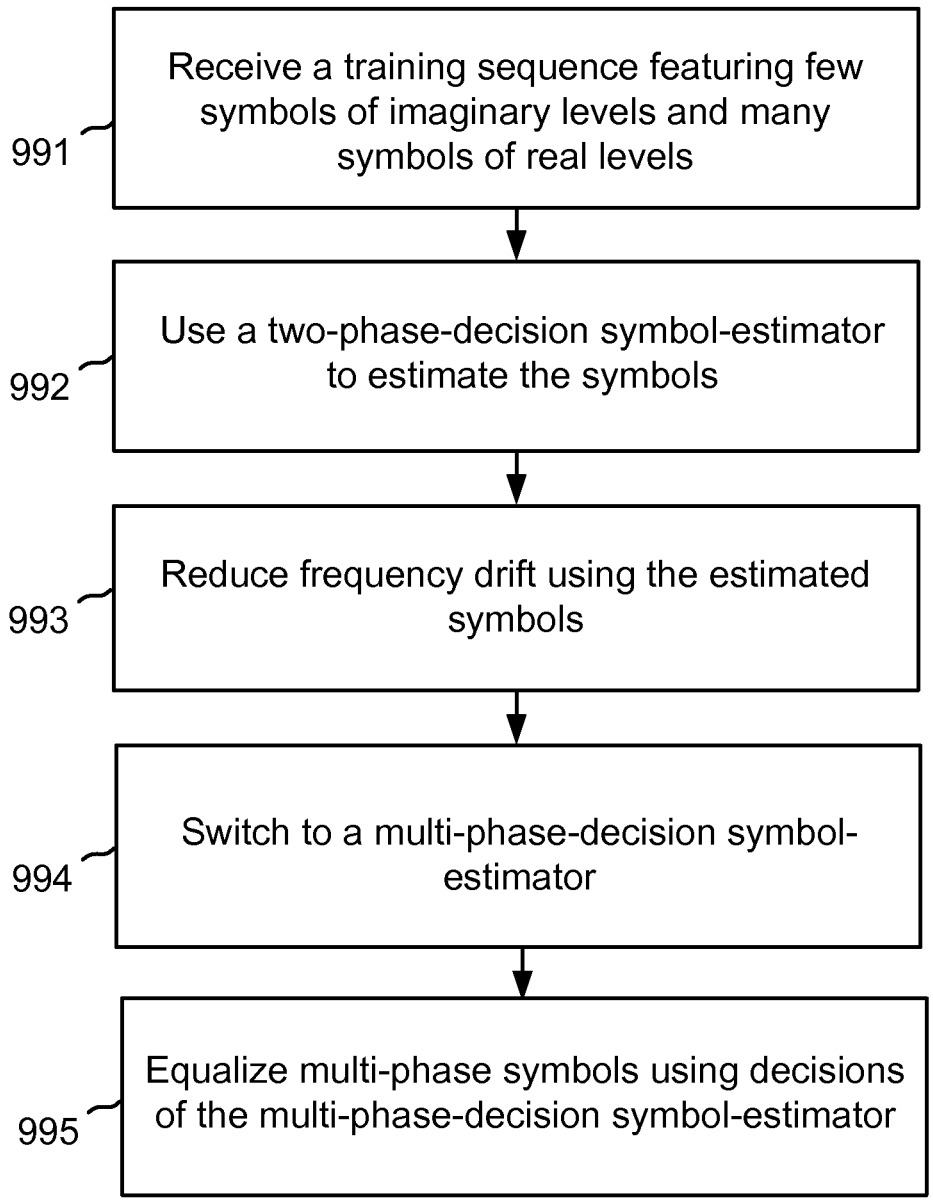
FIG. 16 is a flow diagram describing one embodiment of reducing frequency drift and equalizing multi-phase symbols.
Figure 17:
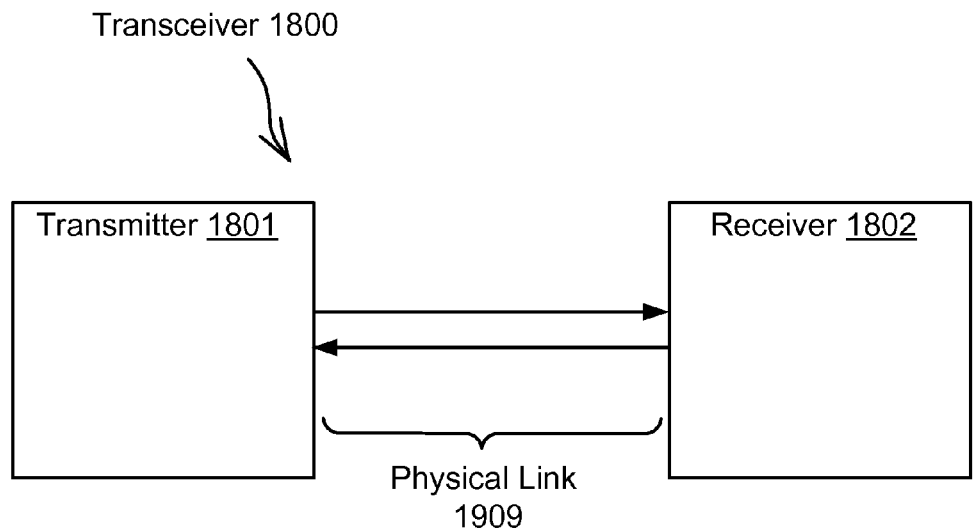
FIG. 17 illustrates one embodiment of a communication system and a physical link.
Figure 18:
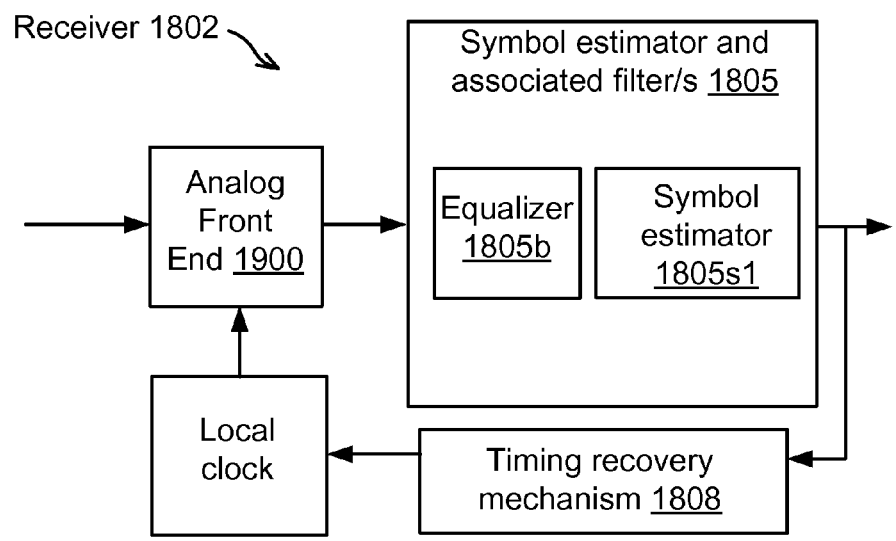
FIG. 18 illustrates one embodiment of a receiver.
Figure 19:
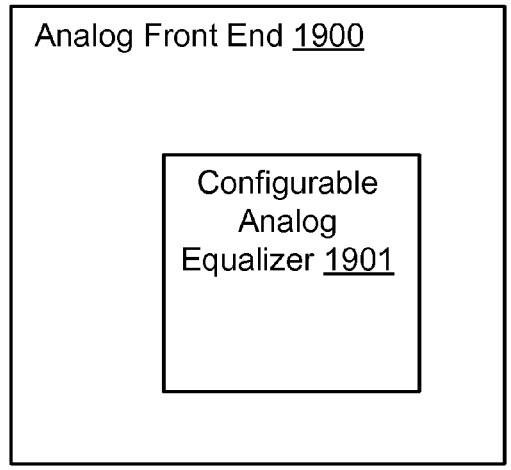
FIG. 19 illustrates one embodiment of an analog front end belonging to a receiver.
Figure 20:
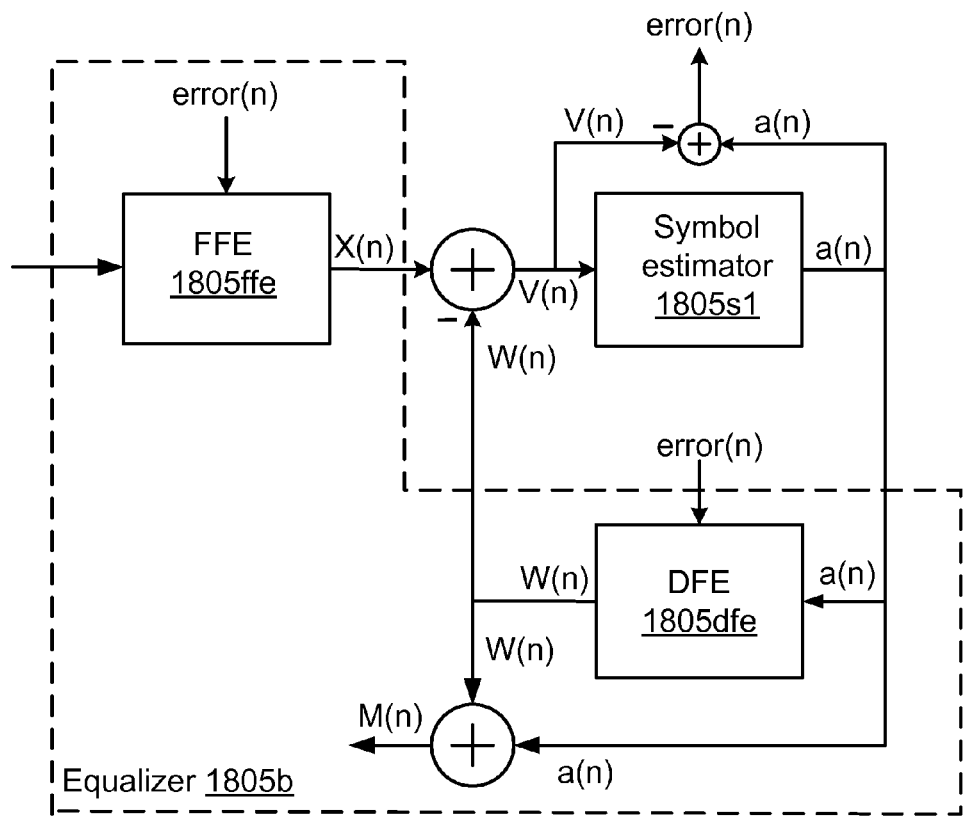
FIG. 20 illustrates one embodiment of an equalizer.
Figure 21:
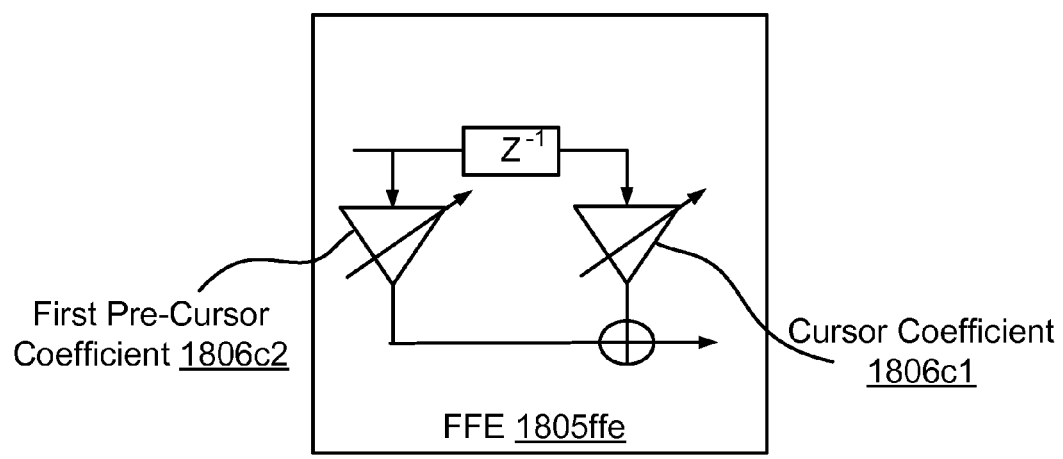
FIG. 21 illustrates one embodiment of a Feed Forward Equalizer (FFE)
Figure 22:
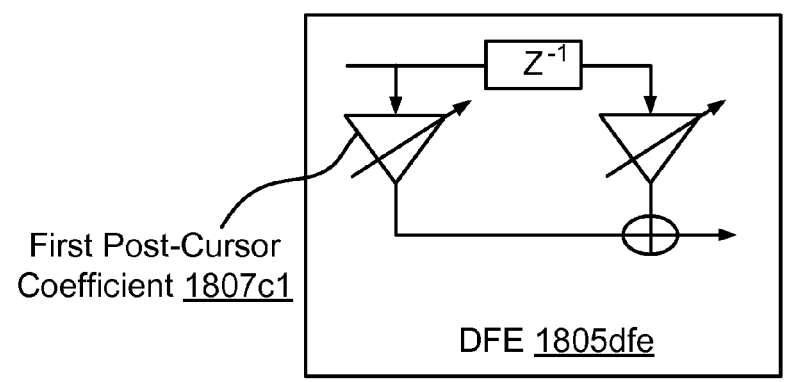
FIG. 22 illustrates one embodiment of a Decision Feedback Equalizer (DFE)

FIG. 16 illustrates a flow diagram describing one method for reducing frequency drift and equalizing multi-level symbols: In step 991, receiving, by a receiver, a training sequence featuring few symbols of imaginary levels and many symbols of real levels. In step 992, using a two-phase-decision symbol-estimator to estimate the symbols. In step 993, reducing frequency drift between a transmitter that transmitted the training sequence and the receiver, using the estimated symbols. In step 994, switching from the two-phase-decision symbol-estimator to a multi-phase-decision symbol-estimator. And in step 995, equalizing multi-phase symbols using decisions made by the multi-phase-decision symbol-estimator.

In one embodiment, an equalizer in a receiver includes an analog equalizer component, a Feed Forward Equalizer (FFE) component, and a Decision Feedback Equalizer (DFE) component. All three equalizer components have advantages and disadvantages related to noise and error amplification. The three configurable equalizer components are therefore brought into an operating configuration where each component performs substantially optimally and achieving a total equalization solution that is capable of supporting low-noise and reduced error operation. The desired operating configuration is achieved by: (i) starting with a weak (moderate) high-pass frequency configuration of the analog equalizer, (ii) letting the FFE and DFE converge, (iii) checking whether the FFE and DFE have both converged into a balanced solution, and (iv) increasing the intensity of the high-pass frequency response of the analog equalizer, until the FFE and DFE both converge into a balanced solution. In one embodiment, the balanced solution is a solution that achieves a linear phase response. In one embodiment, the balanced solution is a solution that results in substantially equal frequency response distribution between the FFE and the DFE. In one embodiment, the balanced solution is characterized by: (i) analog equalizer having certain high-pass frequency characteristics, which avoid amplifying high pass cross-talk noise, (ii) residual pre-cursor inter-symbol interference cancelation being performed by the FFE with minimum high-pass frequency characteristics, and with optional constraint operative to avoid intervention with a timing recovery mechanism, and (iii) residual Post Cursor inter-symbol interference cancelation being performed by the DFE, with optional bounded coefficient values, operative to avoid error propagation.

Figure 23:
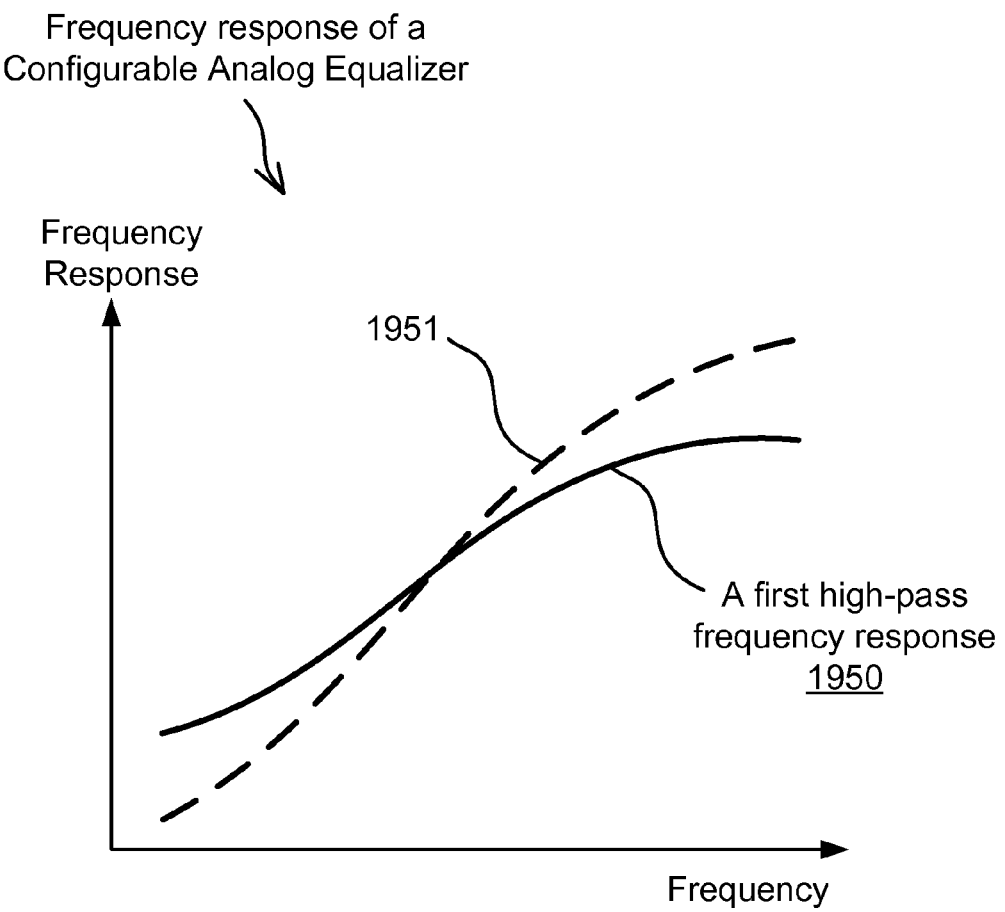
FIG. 23 illustrates embodiments of possible selectable high-pass frequency responses belonging to a configurable analog equalizer.
Figure 24:
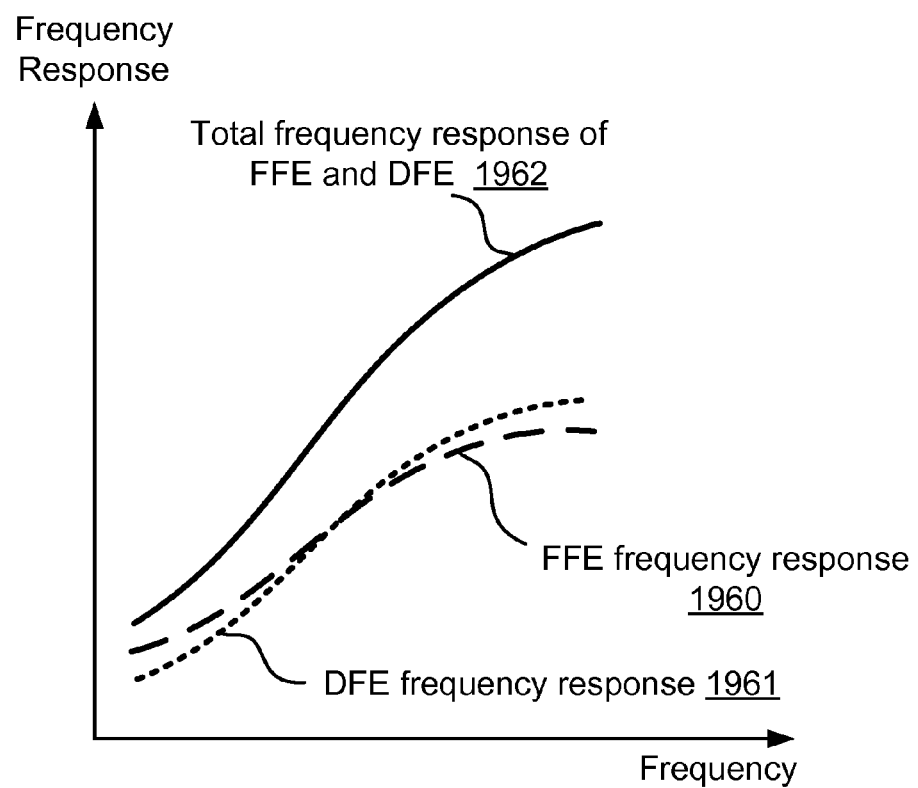
FIG. 24 illustrates embodiments of possible high-pass frequency responses belonging to FFE and DFE.

FIG. 17, FIG. 18, FIG. 19, FIG. 20, FIG. 21, FIG. 22, FIG. 23 and FIG. 24 illustrate some embodiments of a communication system operative to equalize communication signals. A configurable analog equalizer 1901 (illustrated in FIG. 19), belonging to an analog front end 1900 of receiver 1802 (illustrated in FIG. 17 and FIG. 18), is set to a first high-pass frequency response 1950, illustrated in FIG. 23. The first high-pass frequency response 1950 is intentionally too moderate to compensate for low-pass frequency response characteristics of physical link 1909, which connects a transmitter 1801 and receiver 1802. A Feed Forward Equalizer (FFE) 1805$f\!fe$ (illustrated in FIG. 20 and FIG. 21) is activated at receiver 1802. The FFE 1805$f\!fe$ includes a set of coefficients having a minimum configuration of a cursor coefficient 1806$c1$ and a first pre-cursor coefficient 1806$c2$, illustrated in FIG. 21. A Decision Feedback Equalizer (DFE) 1805$dfe$ is activated at receiver 1802 as well. DFE 1805$dfe$, illustrated in FIG. 20 and FIG. 22, includes a set of coefficients having a minimum configuration of a first post-cursor coefficient 1807$c1$. FIG. 23 illustrates one embodiment in which the configurable analog equalizer 1901 is set to a high-pass frequency response 1951 that is more intense than the first high-pass frequency response 1950, until the first post-cursor coefficient 1807$c1$ of the DFE substantially equals an absolute value of a quotient obtained by dividing the first pre-cursor coefficient 1806$c2$ of FFE 1805$f\!fe$ by the cursor coefficient 1806$c1$ of FFE 1805$f\!fe$. It is noted that when the first post-cursor coefficient 1807$c1$ of DFE 1805$dfe$ substantially equals the absolute value of the quotient, the resulting total (combined) frequency response 1962 (illustrates in FIG. 24) of the FFE 1805$f\!fe$ and DFE 1805$dfe$ is substantially equally partitioned between FFE 1805$f\!fe$ and DFE 1805$dfe$, resulting in substantially total (combined) linear phase.

In one embodiment, the first high-pass frequency response 1950 of configurable analog equalizer 1901 is repeatedly increased, while allowing DFE 1805$dfe$ to substantially converge after each increment. Incrementing the high-pass frequency response of the DFE stops once the first post-cursor coefficient 1807$c1$ of DFE 1805$dfe$ substantially equals the absolute value of the quotient obtained by dividing the first pre-cursor coefficient 1806$c2$ of FFE 1805$f\!fe$ by the cursor coefficient 1806$c1$ of FFE 1805$f\!fe$. In one embodiment, incrementing the high-pass frequency response of the DFE stops once the first post-cursor coefficient 1807$c1$ of DFE 1805$dfe$ drops below the absolute value of the quotient. In one embodiment, the high-pass frequency response of the configurable analog equalizer is fine-tuned until the first post-cursor coefficient 1807$c1$ of DFE 1805$dfe$ substantially equals the absolute value of the quotient.

In one embodiment, the first post-cursor coefficient 1807$c1$ of DFE 1805$dfe$ is kept below 0.5 during the process of increasing the frequency response of the configurable analog equalizer. It is noted that keeping the first post-cursor coefficient of the DFE is below 0.5 eliminates noise propagation from a previous symbol estimator error.

In one embodiment, the ratio between the cursor coefficient 1806$c1$ of FFE 1805$f\!fe$ and the first pre-cursor coefficient 1806$c2$ of FFE 1805$f\!fe$ is set to a fixed value at least during a period when a timing recovery mechanism 1808 at the receiver 1802 and the FFE 1805$f\!fe$ are in a convergence process. In one embodiment, the ratio between the cursor coefficient of the FFE and a first pre-cursor coefficient of the FFE is set to a value expected to result in best frequency compensation to an expected frequency response of the physical link 1909 coupling the transmitter 1801 and the receiver 1802. It is noted that setting to a fixed value the ratio between the cursor coefficient of the FFE and a first pre-cursor coefficient of the FFE results in decoupled correct convergence of the timing recovery mechanism 1808 and of FFE 1805$f\!fe$ coefficients. In one embodiment, the ratio between the cursor coefficient 1806$c1$ of FFE 1805$f\!fe$ (illustrated in FIG. 21) and the first pre-cursor coefficient 1806$c2$ of the FFE 1806$f\!fe$ is set to a value expected to result in best frequency compensation to an expected combined frequency response of physical link 1909 and the configurable analog equalizer 1901.

In one embodiment, the fixed value of the ratio between the cursor coefficient 1806$c1$ of the FFE 1805$f\!fe$ and the first pre-cursor coefficient 1806$c2$ of the FFE 1806$f\!fe$ is set once after setting the configurable analog equalizer 1901 to the first high-pass frequency response 1950. In one embodiment, the fixed value of the ratio between the cursor coefficient of the FFE and the first pre-cursor coefficient of the FFE is re-set after increasing the high-pass frequency response of the configurable analog equalizer. In one embodiment, the fixed value of the ratio between the cursor coefficient of the FFE and the first pre-cursor coefficient of the FFE is changed only slightly for fine-tuning after increasing the high-pass frequency response of the configurable analog equalizer. In one embodiment, the fixed value of the ratio between the cursor coefficient of the FFE and the first pre-cursor coefficient of the FFE is set once before receiving signals at receiver 1802.

In one embodiment, a system for equalizing communication signals includes: (i) a configurable analog equalizer 1901, (ii) a Feed Forward Equalizer (FFE) 1805$f\!fe$ featuring set of coefficients having a minimum configuration of a cursor coefficient 1806$c1$ and a first pre-cursor coefficient 1806$c2$, and (iii) a Decision Feedback Equalizer (DFE) 1805$dfe$ featuring a set of coefficients having a minimum configuration of a first post-cursor coefficient 1807$c1$. The system sets the configurable analog equalizer to a first high-pass frequency response 1950 that is intentionally too moderate to compensate for a low-pass frequency response of a physical link 1909 coupling a transmitter 1801 and the system. The system then activates the FFE 1805$f\!fe$ and DFE 1805$dfe$, and then sets the configurable analog equalizer 1901 to a high-pass frequency response 1951 that is more intense than the first high-pass frequency response 1950, until the first post-cursor coefficient 1807$c1$ of the DFE 1805$dfe$ substantially equals an absolute value of a quotient obtained by dividing the first pre-cursor coefficient 1806$c2$ of the FFE 1805$f\!fe$ by the cursor coefficient 1806$c1$ of the FFE 1805$f\!fe$.

Figure 25A:
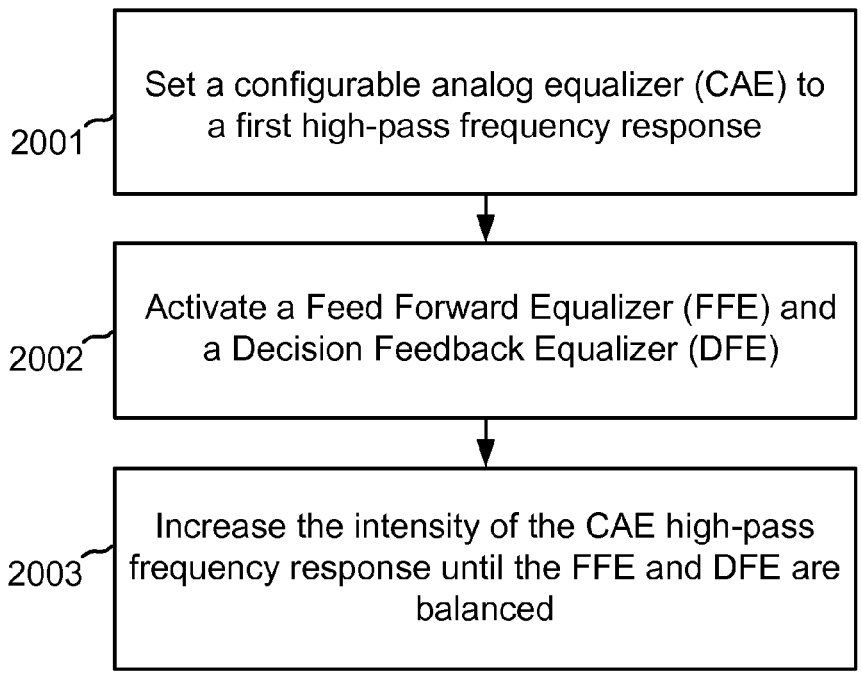
FIG. 25A is a flow diagram describing one embodiment of converging an equalizer.

FIG. 25A illustrates a flow diagram describing one method for converging an equalizer: In step 2001, setting a configurable analog equalizer (CAE) to a first high-pass frequency response. In step 2002, activating a Feed Forward Equalizer (FFE) and a Decision Feedback Equalizer (DFE). In step 2003, increasing the intensity of the CAE high-pass frequency response until the FFE and DFE are balanced.

Figure 25B:
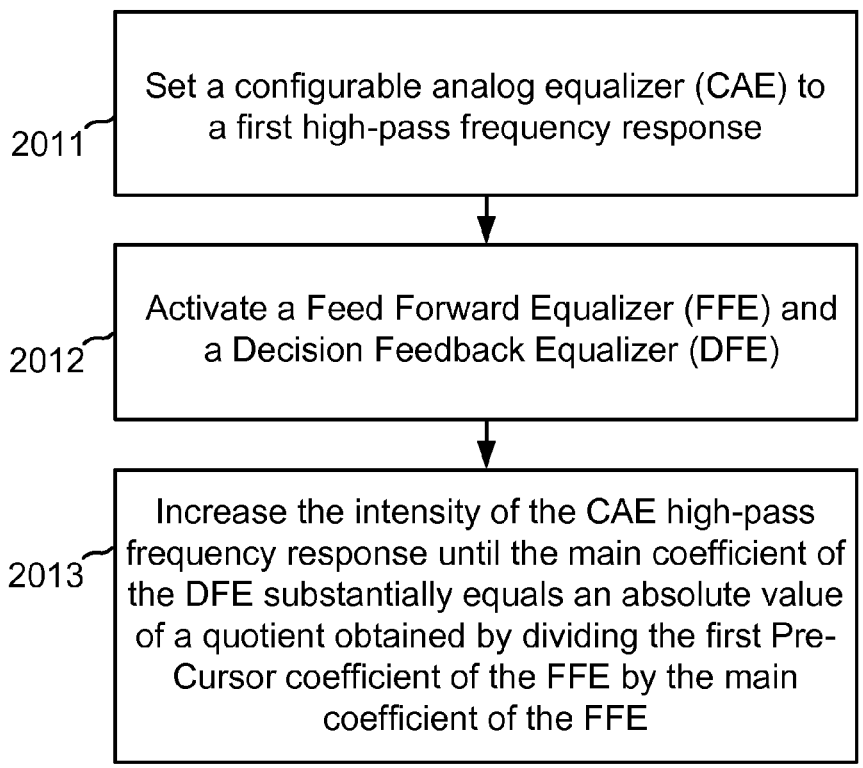
FIG. 25B is a flow diagram describing one embodiment of converging an equalizer.

FIG. 25B illustrates a flow diagram describing one method for converging an equalizer: In step 2011, setting a configurable analog equalizer (CAE) to a first high-pass frequency response. In step 2012, activating a Feed Forward Equalizer (FFE) and a Decision Feedback Equalizer (DFE). In step 2013, increasing the intensity of the CAE high-pass frequency response until the first post-cursor coefficient of the DFE substantially equals an absolute value of a quotient obtained by dividing the first pre-cursor coefficient of the FFE by the cursor coefficient of the FFE.

In this description, numerous specific details are set forth. However, the embodiments of the invention may be practiced without some of these specific details. In other instances, well known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A method for assuring acquisition of symbol timing in a full-duplex data transceiver under inter-symbol interference conditions, comprising:

determining a first frequency inaccuracy of a first local clock belonging to a transmitter, and a second frequency inaccuracy of a second local clock belonging to a receiver;

assuring that a first free running frequency of the first local clock is lower than a second free running frequency of the second local clock, by setting a difference between the second free running frequency and the first free running frequency to a value higher than sum of the first inaccuracy and the second inaccuracy;

using the first free running frequency to generate symbols at the transmitter;

receiving the generated symbols at the receiver;

decreasing, at the receiver, the frequency of the second local clock, to a third frequency value closer to the first free running frequency, using a first type decision-directed timing recovery mechanism that is limited to only decreasing and not increasing the frequency of the second local clock, wherein the limitation of the first type decision-directed timing recovery mechanism assures convergence into the third frequency value under substantial inter-symbol interference conditions;

disabling the first type decision-directed timing recovery mechanism after reaching the third frequency value; and phase-locking the second local clock to substantially optimal phase under Minimum Mean Square Error (MMSE) criteria, using a second type decision-directed timing recovery mechanism, which is not limited to only decreasing the frequency of the second local clock.

2. The method of claim 1, wherein the transmitter is connected to the receiver via a twisted-pair wire, the symbols are transmitted at a rate of at least 125 million symbols per second, and the receiver further comprises an equalizer operative to reduce inter-symbol interferences.

3. The method of claim 2, further comprising: enabling convergence to the third frequency value by using the first type decision-directed timing recovery mechanism that is limited to only decreasing and not increasing the frequency of the second local clock; and allowing the equalizer to reach steady state operation in conjunction with the second type decision-directed timing recovery mechanism, while phase-locking the second local clock to the optimal phase under MMSE criteria.

4. The method of claim 3, wherein the first frequency inaccuracy of the first local clock is below +/−100 Parts Per Million (PPM), the second frequency inaccuracy of the second local clock is below +/−100 PPM, and the difference between the second free running frequency and the first free running frequency is below 200 PPM.

5. The method of claim 3, wherein the first frequency inaccuracy of the first local clock is below +/−100 Parts Per Million (PPM), the second frequency inaccuracy of the second local clock is below +/−100 PPM, and the difference between the second free running frequency and the first free running frequency is above 200 PPM.

6. The method of claim 3, wherein the equalizer comprises a Feed-Forward Equalizer (FFE) having a constraint facilitating lower inter-symbol interference at least when activating the FFE, wherein the constraint is based on the fact that transmission in done over a wire medium.

7. The method of claim 6, wherein the constraint is achieved by associating main and 1st pre-cursor taps of the FFE.

8. The method of claim 7, wherein the equalizer comprises a Decision-Feedback Equalizer (DFE).

9. The method of claim 1, wherein the transmitter is connected to the receiver via a twisted-pair wire, the receiver comprises an equalizer operative to reduce inter-symbol interferences, and the first type decision-directed timing recovery mechanism comprises a first timing detector which is based on estimation of g(−1)−k*g(1), wherein g(n) denotes impulse response of the twisted-pair wire and the equalizer at time n, k denotes a constant value having a range between 1.5 and 5, and the first timing detector is operative to facilitate fast convergence into the third frequency.

10. The method of claim 1, wherein the second type decision-directed timing recovery mechanism comprises a second timing detector which is based on estimation of g(−1)−g(1), wherein the second timing detector is operative to facilitate accurate phase-locking and tracking of the second local clock to the optimal phase under MMSE criteria.

11. The method of claim 9, wherein the equalizer comprises a Feed-Forward Equalizer (FFE), a Decision-Feedback Equalizer (DFE), and a symbol estimator; and g(−1)−g(1) is estimated using the expression [M(n)−M(n−2)]*e(n−1), wherein M(n) equals W(n)+a(n), a(n) is estimation of symbols at output of the symbol estimator, W(n) is output of the DFE, e(n) equals a(n)−V(n), V(n) equals X(n)−W(n), and X(n) is output of the FFE.

12. The method of claim 11, wherein k equals 2, and g(−1)−k*g(1) is estimated using the expression [M(n)−M(n−2)]*e(n−1)−[(a(n)−a(n−1))*e(n)].

13. The method of claim 1, wherein the third frequency value essentially equals the first free running frequency.

14. The method of claim 1, wherein the third frequency value is within +/−10 Parts Per Million (PPM) of the first free running frequency.

15. The method of claim 1, further comprising:
using a two-level decision metric, in conjunction with the first type decision-directed timing recovery mechanism, during decreasing of the frequency of the second local clock to the third frequency value, in order to facilitate convergence into the third frequency; and
using a multiple-level decision metric, in conjunction with the second type decision-directed timing recovery mechanism, after phase-locking the second local clock to the optimal phase under MMSE criteria, in order to facilitate accurate symbol estimation.

16. The method of claim 1, wherein the transceiver operates in an environment featuring cross-talk and Additive white Gaussian noise (AWGN).

17. A method for assuring acquisition of symbol timing in a full-duplex data transceiver under inter-symbol interference conditions, comprising:
determining a first frequency inaccuracy of a first local clock belonging to a transmitter, and a second frequency inaccuracy of a second local clock belonging to a receiver;
assuring that a first free running frequency of the first local clock is higher than a second free running frequency of the second local clock, by setting a difference between the first free running frequency and second first free running frequency to a value that is higher than sum of the first inaccuracy and the second inaccuracy;
using the first free running frequency to generate symbols at the transmitter;
receiving the generated symbols at the receiver;
increasing, at the receiver, the frequency of the second local clock, to a third frequency value that is closer to the first free running frequency, using a first type decision-directed timing recovery mechanism that is limited to only increasing and not decreasing the frequency of the second local clock, wherein the limitation of the first type decision-directed timing recovery mechanism assures convergence into the third frequency value under substantial inter-symbol interference conditions;
disabling the first type decision-directed timing recovery mechanism after reaching the third frequency value; and
phase-locking the second local clock with the first local clock, using a second type decision-directed timing recovery mechanism, which is not limited to only increasing the frequency of the second local clock.

18. The method of claim 17, wherein the transmitter is connected to the receiver via a twisted-pair wire, the symbols are transmitted at a rate of at least 125 million symbols per second, and the receiver further comprises an equalizer operative to reduce inter-symbol interferences.

19. The method of claim 18, further comprising:
enabling convergence to the third frequency value by using the first type decision-directed timing recovery mechanism that is limited to only increasing and not decreasing the frequency of the second local clock; and
allowing the equalizer to reach steady state operation in conjunction with the second type decision-directed timing recovery mechanism, while phase-locking the second local clock to the optimal phase under MMSE criteria.

20. The method of claim 17, wherein the third frequency value essentially equals the first free running frequency.

21. A system for assuring acquisition of symbol timing in a full-duplex data transceiver under inter-symbol interference conditions, comprising:
a transmitter comprising a first local clock having a first free running frequency; and
a receiver comprising a second local clock having a second frequency initially set to a value higher than the first free running frequency, a first type decision-directed timing recovery mechanism that is limited to only decreasing and not increasing the frequency of the second local clock, and a second type decision-directed timing recovery mechanism that is not limited to only decreasing the frequency of the second local clock;
wherein the receiver is configured to receive, from the transmitter, symbols generated using the first local clock, decrease the frequency of the second local clock to a third frequency value that is closer to the first free running frequency using the first type decision-directed timing recovery mechanism, disable the first type decision-directed timing recovery mechanism after reaching the third frequency value, and phase-lock and keep track the second local clock to the optimal phase under Minimum Mean Square Error (MMSE) criteria using the second type decision-directed timing recovery mechanism; and
operative to assure convergence into the third frequency value under substantial inter-symbol interference conditions.

22. The system of claim 21, wherein the transmitter is connected to the receiver via a twisted-pair wire, the symbols are transmitted at a rate of at least 125 million symbols per second, and therefore the receiver comprises an equalizer operative to reduce inter-symbol interferences.

23. The system of claim 22, wherein the equalizer comprises a Feed-Forward Equalizer (FFE) having a constraint facilitating lower inter-symbol interference at least when activating the FFE, wherein the constraint is based on the fact that transmission is done over a wire medium.

24. The system of claim 23, wherein the constraint is achieved by associating main and 1st pre-cursor taps of the FFE.

25. The system of claim 24, wherein the equalizer comprises a Decision-Feedback Equalizer (DFE).

26. The system of claim 21, wherein the transmitter is connected to the receiver via a twisted-pair wire, the receiver comprises an equalizer operative to reduce inter-symbol interferences, and the first type decision-directed timing recovery mechanism comprises a first timing detector which is based on estimation of g(−1)−k*g(1), wherein g(n) denotes impulse response of the twisted-pair wire and the equalizer at time n, k denotes a constant value having a range between 1.5 and 5, and the first timing detector is operative to facilitate fast convergence into the third frequency.

27. The system of claim 21, wherein the second type decision-directed timing recovery mechanism comprises a second timing detector which is based on estimation of g(−1)−g(1), wherein the second timing detector is operative to facilitate accurate phase-locking and tracking of the second local clock to the optimal phase under MMSE criteria.

28. The system of claim 26, wherein the equalizer comprises a Feed-Forward Equalizer (FFE), a Decision-Feedback Equalizer (DFE), and a symbol estimator; and g(−1)−g(1) is estimated using the expression [M(n)−M(n−2)]*e(n−1), wherein M(n) equals W(n)+a(n), a(n) is estimation of symbols at output of the symbol estimator, W(n) is the output of the DFE, e(n) equals a(n)−V(n), V(n) equals X(n)−W(n), and X(n) is the output of the FFE.

29. The system of claim 28, wherein k equals 2, and g(−1)−k*g(1) is estimated using the expression [M(n)−M(n−2)]*e(n−1)−[(a(n)−a(n−1))*e(n)].

30. The system of claim 21, wherein the third frequency value essentially equals the first free running frequency.

31. The system of claim 21, wherein the third frequency value is within +/−10 Parts Per Million (PPM) of the first free running frequency.

* * * * *